(12) United States Patent
Nakayama

(10) Patent No.: US 8,780,462 B2
(45) Date of Patent: Jul. 15, 2014

(54) IMAGE FORMING LENS, CAMERA DEVICE, AND HANDHELD TERMINAL

(71) Applicant: Takahiro Nakayama, Yokohama (JP)

(72) Inventor: Takahiro Nakayama, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 13/728,687

(22) Filed: Dec. 27, 2012

(65) Prior Publication Data
US 2013/0215321 A1 Aug. 22, 2013

Related U.S. Application Data

(62) Division of application No. 12/786,913, filed on May 25, 2010, now Pat. No. 8,369,030.

(30) Foreign Application Priority Data

| May 25, 2009 | (JP) | 2009-125843 |
| Jul. 22, 2009 | (JP) | 2009-171544 |
| Jul. 22, 2009 | (JP) | 2009-171577 |

(51) Int. Cl.
*G02B 9/62* (2006.01)

(52) U.S. Cl.
CPC ............................. *G02B 9/62* (2013.01)
USPC ..................................... 359/752; 359/762

(58) Field of Classification Search
USPC ..................................... 359/749–752, 762
See application file for complete search history.

(56) References Cited

U.S. PATENT DOCUMENTS

| 6,275,343 | B1 | 8/2001 | Takamoto et al. | |
| 6,747,815 | B2* | 6/2004 | Takatsuki | 359/749 |
| 7,372,636 | B2 | 5/2008 | Sudoh | |
| 7,423,819 | B1 | 9/2008 | Chuang et al. | |
| 7,535,653 | B2 | 5/2009 | Sudoh | |
| 7,623,298 | B2 | 11/2009 | Sudoh | |
| 7,636,201 | B2 | 12/2009 | Sudoh et al. | |
| 7,719,773 | B2 | 5/2010 | Atsuumi et al. | |
| 8,018,663 | B2 | 9/2011 | Ohashi et al. | |
| 8,149,524 | B2* | 4/2012 | Inoue | 359/784 |
| 8,284,501 | B2 | 10/2012 | Sudoh | |
| 8,379,329 | B2 | 2/2013 | Nakayama et al. | |
| 8,405,917 | B2 | 3/2013 | Sudoh | |
| 2002/0057505 | A1 | 5/2002 | Sato | |
| 2008/2788779 | | 11/2008 | Nishina et al. | |
| 2009/0147375 | A1 | 6/2009 | Sudoh et al. | |
| 2009/0201590 | A1* | 8/2009 | Sugita | 359/680 |

(Continued)

FOREIGN PATENT DOCUMENTS

| JP | 61-170716 | 8/1986 |
| JP | 6-308385 | 11/1994 |

(Continued)

*Primary Examiner* — Jordan Schwartz
(74) *Attorney, Agent, or Firm* — Oblon, Spivak, McClelland, Maier & Neustadt, L.L.P.

(57) ABSTRACT

An image forming lens including an aperture stop, a first lens group, and a second lens group having a positive power, the first lens group including a first F lens group having a negative power and a first R lens group having a positive power, the first F lens group including at least two negative lenses, the first R lens group including at least one positive lens, the second lens group including a second F lens group having a positive power and a second R lens group, the second F lens group including a first positive lens, a first negative lens, a second negative lens, and a second positive lens, and the second R lens group including at least one lens.

9 Claims, 18 Drawing Sheets

(56) References Cited

U.S. PATENT DOCUMENTS

| | | |
|---|---|---|
| 2009/0323200 A1 | 12/2009 | Sudoh |
| 2010/0027136 A1 | 2/2010 | Ohashi et al. |
| 2010/0027254 A1 | 2/2010 | Nakayama |
| 2011/0228408 A1 | 9/2011 | Sudoh |
| 2012/0127586 A1 | 5/2012 | Sudoh |

FOREIGN PATENT DOCUMENTS

| | | |
|---|---|---|
| JP | 7-46337 | 2/1995 |
| JP | 2001-330774 | 11/2001 |
| JP | 2002-48975 | 2/2002 |
| JP | 2002-62477 A | 2/2002 |
| JP | 3368138 | 11/2002 |
| JP | 3472995 | 9/2003 |
| JP | 2004-21223 A | 1/2004 |
| JP | 2006-39152 | 2/2006 |
| JP | 2006-349920 | 12/2006 |
| JP | 2008-33212 | 2/2008 |
| JP | 2008-129403 | 6/2008 |
| JP | 2008-170720 A | 7/2008 |

\* cited by examiner

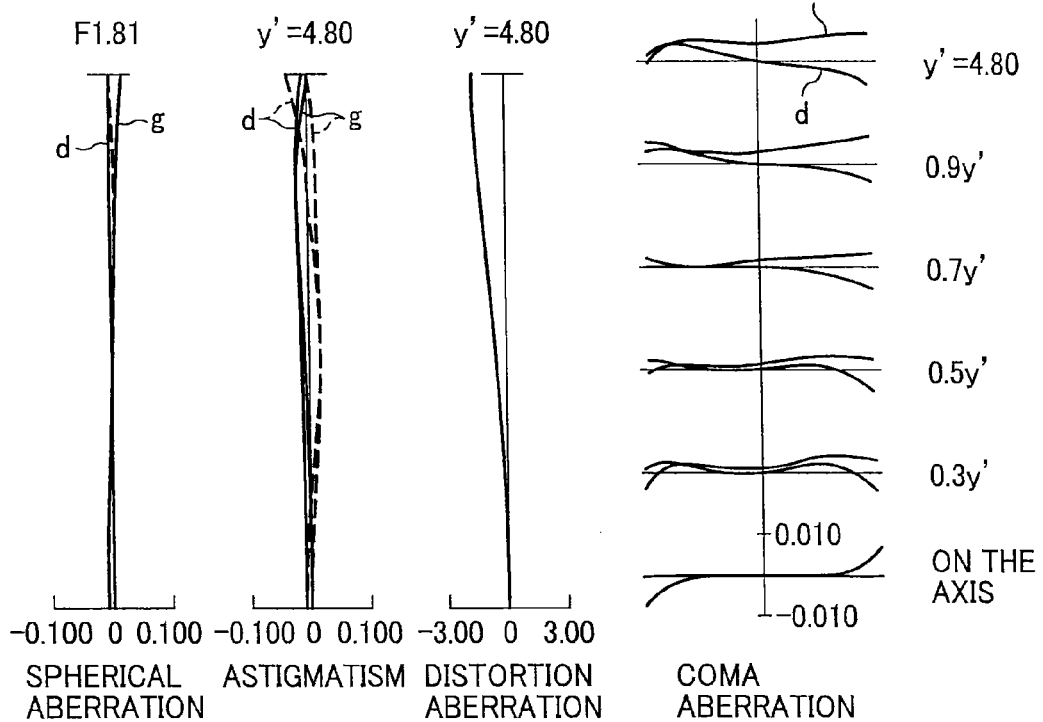
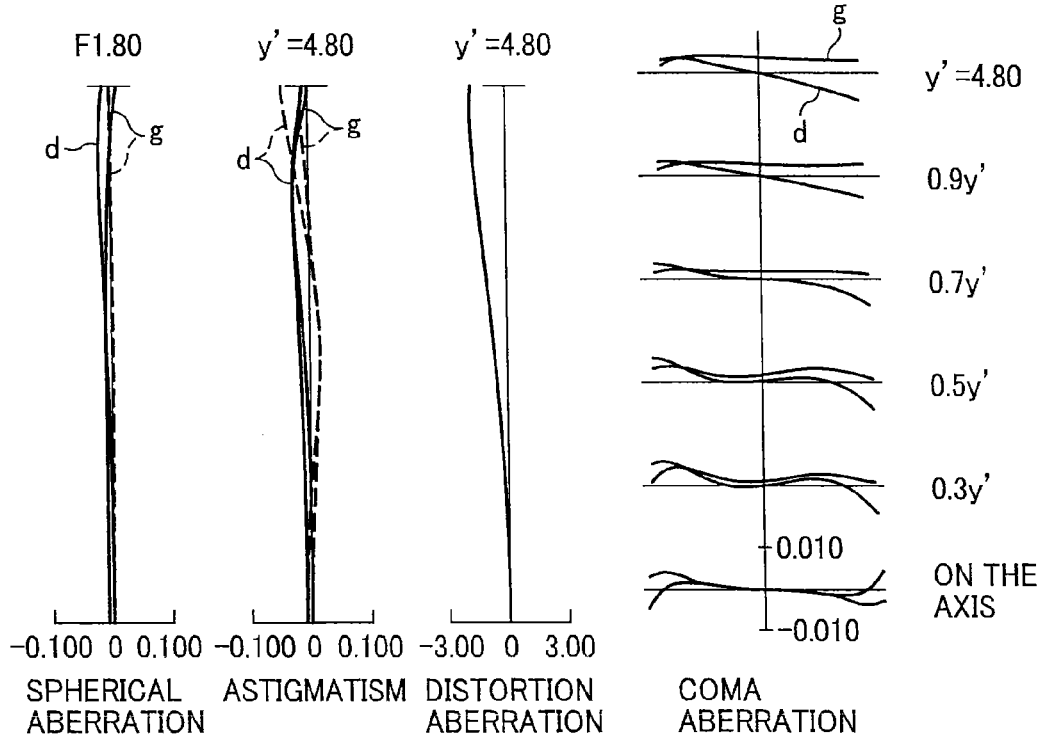

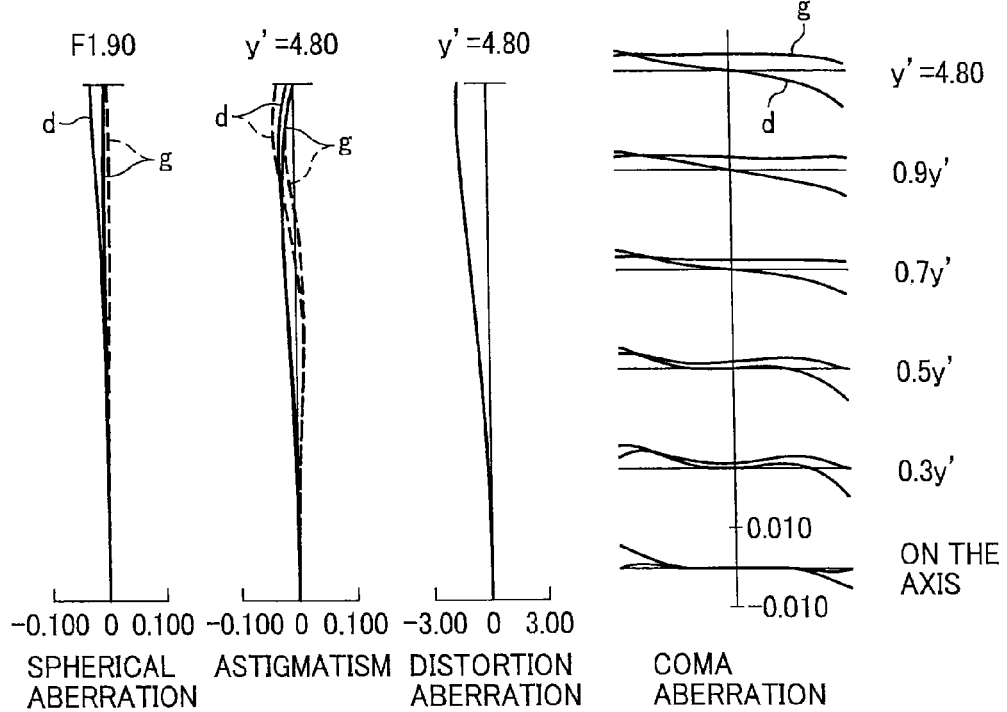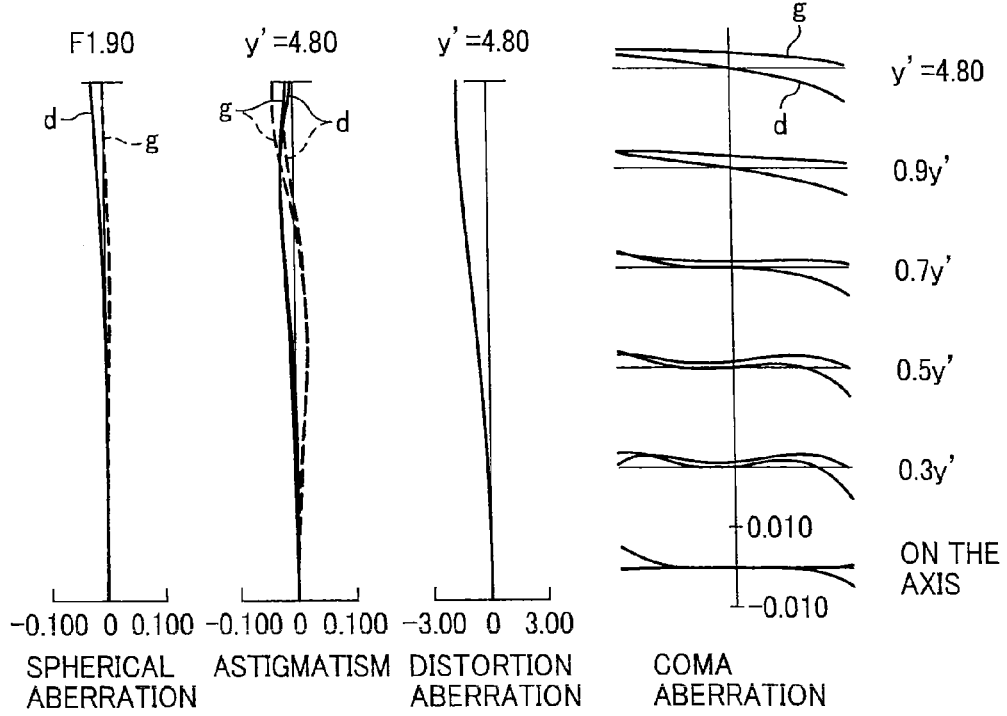

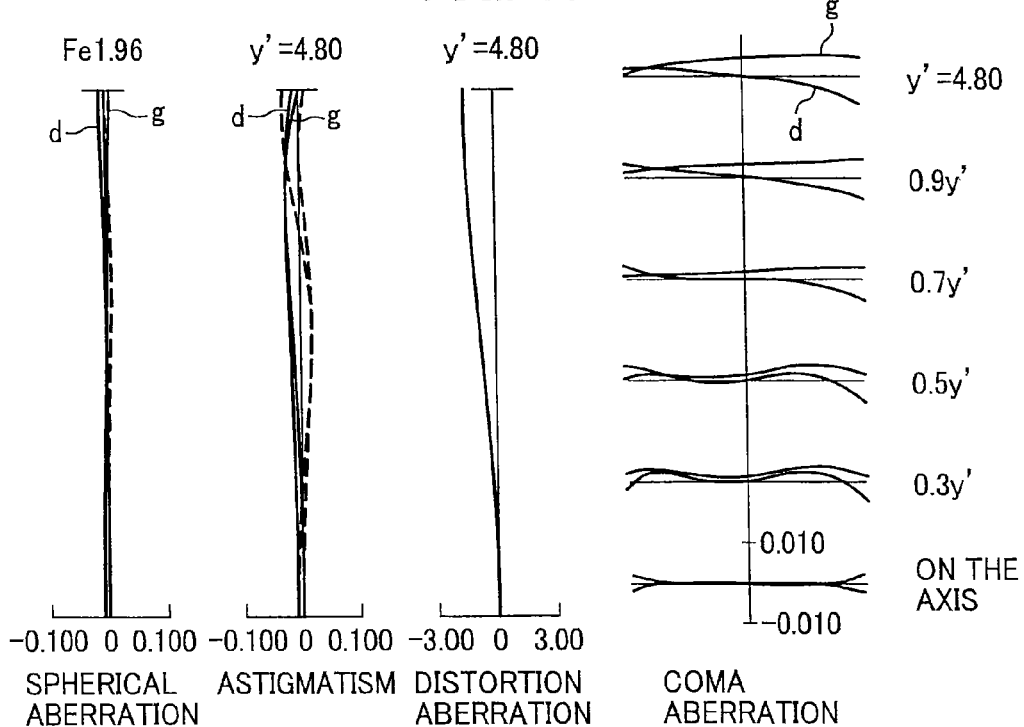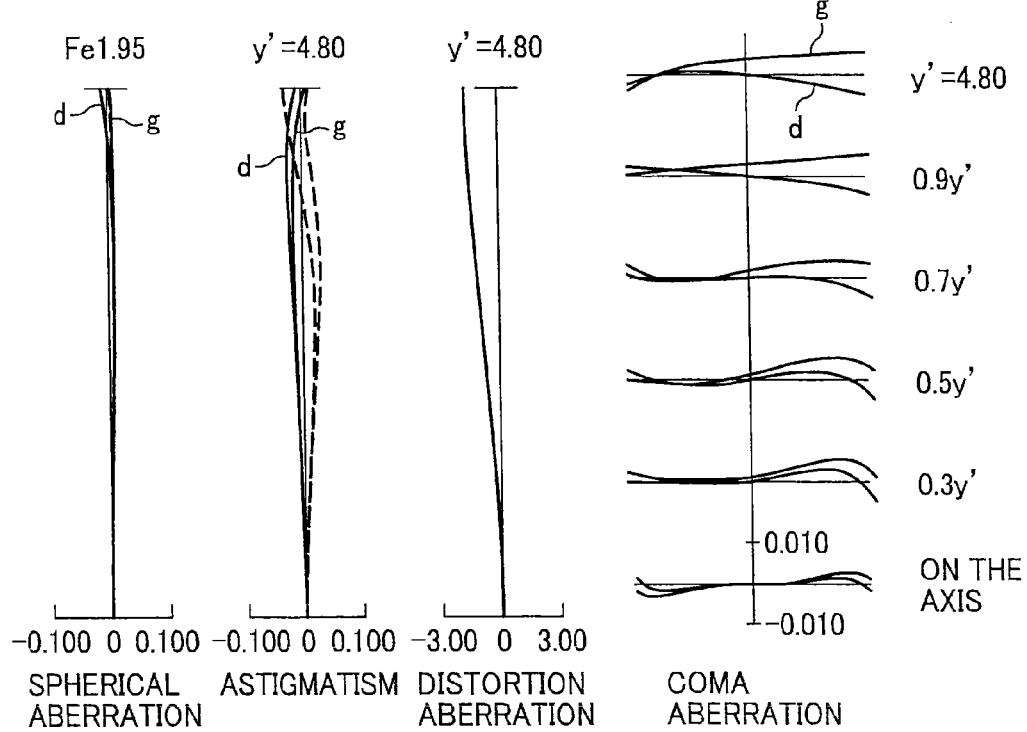

ID, CAMERA DEVICE,
AND HANDHELD TERMINAL

CROSS REFERENCE

This application is a continuation of and is based upon and claims the benefit of priority under 35 U.S.C. §120 for U.S. Ser. No. 12/786,913, filed May 25, 2010 now U.S. Pat. No. 8,369,030, the entire contents of each which are incorporated herein by reference, and claims the benefit of priority under 35 U.S.C. §119 from Japanese Patent Application No. 2009-171544, filed Jul. 22, 2009, Japanese Patent Application No. 2009-125843, filed May 25, 2009, and Japanese Patent Application No. 2009-171577, filed Jul. 22, 2009.

BACKGROUND OF THE INVENTION

1. Field of the Invention

The present invention relates to a lens, a camera device, and a handheld terminal.

The lens is suitably used as a lens for photo shooting by a digital camera, a digital video camera, or a silver-halide film camera.

Therefore, the camera of the present invention may be a digital camera, a digital video camera, or a silver-halide film camera.

In addition, a handheld terminal using the digital camera and/or the digital video camera as the imaging function that processes information such as communication is provided.

2. Discussion of the Background

As digital cameras have become widely diffused, the performance and capabilities thereof have been improved and various types of cameras are now available in the market.

Among these, a number of users demand a quality compact-size camera having a high-performance single focus lens, and are waiting for the emergence of a camera product with a lens of large diameter having a small F number in addition to high performance.

Here, high performance means, for example, a resolution corresponding to an image pick-up of from at least 10,000,000 to 20,000,000 pixels, less coma flare when the aperture stop is fully open, less point image collapse to the periphery of the field angle of view under high contrast, less chromatic aberration resulting in no unneeded coloring in a portion having a large luminance difference, and less distortion aberration under which a straight line can be depicted as a straight line.

In addition, with regard to the large-diameter lens, an f number of at least F2.4 or less and preferably F2.0 or less is greatly requested to distinguish it from a compact camera on which a zoom lens is mounted.

Furthermore, with the angle of field, a half angle of field of 38 degrees or more corresponding to a focal length of 28 mm in conversion of a 35 mm silver salt film camera ("Leica version") is preferable.

As a specific lens arrangement of a wide-angle single focus lens there is a "retrofocus" type, in which a lens group (front element) having a negative refractive power is located on the object side and a lens group (rear element) having a positive refractive power is located on the image side.

The retrofocus type is suitably used as an image focus lens arrangement for a digital camera, a digital video camera, etc., using an area sensor having a color filter or a micro lens for each pixel, because the exit pupil can be positioned away from the image to make the peripheral beams of light enter into the image surface at an angle close to a right angle.

However, the retrofocus type has a large refractive power arrangement asymmetry, which tends to cause incomplete correction of coma aberration, distortion aberration, chromatic aberration of magnification, etc.

Focus lenses of the retrofocus type are of great variety. Unexamined published Japanese patent application Nos. (hereinafter referred to as JP) H06-308385-A, 2006-349920-A and H09-218350-A describe lenses having a half angle of field of around 38 degree with a large diameter.

Although the image focusing lenses described in JP H06-308835-A have a large diameter (F1.4), astigmatism and field curvature of the lenses are also large, meaning that performance at the periphery when the aperture stop is fully open tends to be problematic. Thus, the lens is thought to be not suitable for an image pick-up element of 10,000,000 to 20,000,000 pixels.

The image focusing lenses described in JP 2006-349920-A are suitably corrected with regard to astigmatism, field curvature and distortion aberration but with a slightly large spherical aberration.

Demand for greater compactness of digital cameras and digital video cameras remains stronger than ever. Thus, although generally successful, the lens having a small f number as described in JP 2006-349920-A is slightly insufficient considering the level of compactness now required.

The lenses described in JPs H09-218350-A and H07-46337-A has F2.8, meaning that the lenses do not satisfy recent demand. In addition, correction of astigmatism, field curvature, and chromatic aberration of magnification is insufficient in terms of the lens performance out to the peripheral.

Any of the lenses described in JPs H06-308385-A and H09-218350-A has a distortion aberration greater than 2% in absolute value.

JP 2008-129403-A describes an image forming lens having F2.9, meaning that the lens is insufficient in terms of the diameter thereof. In addition, the field curvature of the lens is too large to secure good performance out to the periphery. Furthermore, a great many lenses are required and thus size reduction is not easy to achieve.

In addition, although digital cameras have been reduced in size in recent years even further reductions in size have been demanded.

Accordingly, with regard to the compact size digital camera, a storing (retraction) mechanism is proposed in which the entire photographic optical system is retracted into the camera body by reducing the space between the lens groups and lenses of the photographic optical system so as to avoid protrusion of the optical system from the camera body when the camera is not in use.

However, an increase of the diameter of the lens leads to an increase in the number of the lenses in the system, resulting in an increase in the total thickness of the lenses. Thus, the length of the lens barrel increases irrespective of any reduction in the space between the lens groups and/or the lenses on the optical axis by the storing mechanism, with the result that the lens barrel may not be sufficiently contained in the camera body.

JP 2006-39152-A describes a technology of retracting a photographic optical system into the body of a digital camera, a digital video camera, or a handheld terminal, in which the lenses constituting the system is retracted from the optical axis. However, JP 2006-39152-A makes no specific mention of the photographic system to be retracted into the body of a camera, etc. Therefore, further refinements are required to deal with a case in which the number of lenses in the photographic optical system increases as a result of an increase in the diameter of the lens.

SUMMARY OF THE INVENTION

For these reasons, the present inventors recognize that a need exists for high performance image focusing lens suitable for a digital camera and a digital video camera that has a wide half angle of about 38 degree and a large diameter with an f number of around 2.0 or less (meaning a relatively small size with a large diameter) while astigmatism, field curvature, chromatic aberration of magnification, color difference of coma aberration, and distortion aberration are sufficiently reduced to deal with a resolution corresponding to an image pick-up element of 10,000,000 to 20,000,000 pixels with less coma flares when the aperture stop is fully open, less point image collapses to the periphery of the field angle of view under high contrast, less chromatic aberration resulting in no unneeded coloring in a portion having a large luminance difference, and less distortion aberration under which a straight line can be depicted as a straight line without distortion.

Furthermore, the present inventors also recognize that a need exists for a camera device and a handheld terminal that contains its image forming lens described above inside the body thereof when not in use.

Accordingly, an object of the present invention is to provide a high performance image focusing lens suitable for a digital camera and a digital video camera that has a wide half angle of about 38 degree and a large diameter with an f number of around 2.0 or less (meaning a relatively small size with a large diameter) while astigmatism, field curvature, chromatic aberration of magnification, color difference of coma aberration, and distortion aberration are sufficiently reduced to deal with a resolution corresponding to an image pick-up element of 10,000,000 to 20,000,000 pixels with less coma flares when the aperture stop is fully open, less point image collapses to the periphery of the field angle of view under high contrast, less chromatic aberration resulting in no unneeded coloring in a portion having a large luminance difference, and less distortion aberration under which a straight line can be depicted as a straight line without distortion and a camera device and a handheld terminal that contains its image forming lens described above inside the body thereof when not in use.

Briefly this object and other objects of the present invention as hereinafter described will become more readily apparent and can be attained, either individually or in combination thereof, by an image forming lens including an aperture stop, a first lens group arranged on the object side relative to the aperture stop, and a second lens group having a positive power arranged on an image side relative to the aperture stop, the first lens group including a first F lens group having a negative power and a first R lens group having a positive power arranged in this sequence from the object side with the widest air space between the first F lens group and the first R lens group, the first F lens group including at least two negative lenses, the first R lens group including at least one positive lens, the second lens group including a second F lens group having a positive power and a second R lens group arranged in this sequence from the object side, the second F lens group including a first positive lens, a first negative lens, a second negative lens, and a second positive lens arranged in this sequence from the object side, and the second R lens group including at least one lens.

It is preferable that, in the image forming lens mentioned above, the second R lens group includes one aspheric surface having a form of decreasing positive power from an optical axis of the second R lens group toward the periphery thereof, a focal length f2F of the second F lens group and a focal length f2R of the second R lens group satisfy the following relationship (1): 0.4<f2F/f2R<0.6, Relationship (1), and the aspheric surface of the second R lens group satisfies the following relationship (2): 0.3<D1/D2<0.5, Relationship (2), where D2 represents a sag amount of the aspheric surface and a surface formed by a paraxial curvature radius at a position of an effective height of H2R of beams of light of the aspheric surface and D1 represents a sag amount of the aspheric surface and a surface formed by a paraxial curvature radius at a position of 0.8×H2R.

It is still further preferable that, in the image forming lens mentioned above, the thickness D2F_2R between the surface of the second F lens group on the object side and the surface of the second R lens group on the image side and the maximum image height Y' satisfy the following relationship (3):

$$1.5 < D2F\_2R/Y' < 3.0 \qquad \text{Relationship (3)}.$$

It is still further preferable that, in the image forming lens mentioned above, the first F lens group includes an aspheric surface having a form of decreasing negative power from an optical axis of the first F lens group to a periphery thereof, the aspheric surface of the second R lens group satisfies the following relationship (4): 0.1<D3/D4<0.3, where D3 represents a sag amount of the aspheric surface and a surface formed by a paraxial curvature radius at a position of 0.7× H1F where H1F represents an effective height of beams of light of the aspheric surface and D4 represents a sag amount of the aspheric surface and a surface formed by a paraxial curvature radius at a position of 0.9×H1F.

It is still further preferable that, in the image forming lens mentioned above, the second R lens group is formed by one aspheric lens.

It is still further preferable that, in the image forming lens mentioned above, the aspheric lens of the second R lens group is formed of a material having an Abbe number vd satisfying the following relationship (5):

$$60 < vd < 96 \qquad \text{Relationship (5)}.$$

It is still further preferable that, in the image forming lens mentioned above, the first F lens group is formed by two negative lenses, the first R lens group is formed by one positive lens, and the second negative lens of the first F lens group from the object side has an aspheric surface on the image side having a form of decreasing negative power from the optical axis of the first F lens group toward the periphery thereof, and the first positive lens and the first negative lens in the second F lens group are cemented and the second negative lens and the second positive lens in the second F lens group are cemented and the second R lens group is formed of one positive lens and a surface thereof on the object side has a form of decreasing positive power from an optical axis of the second R lens group toward the periphery thereof.

It is still further preferable that, in the image forming lens mentioned above, the second R lens group includes one positive lens or one negative lens, and at least one negative lens in the second F lens group satisfies the following relationships (6) and (7):

$$30 < vdn < 41 \qquad \text{Relationship (6)}$$

$$\Delta\theta gFn < 0 \qquad \text{Relationship (7)}.$$

In the relationships (6) and (7), vdn represents an Abbe number of a material forming at least one of the negative lenses in the second F lens group and $\Delta\theta gFn$ represents an abnormal dispersion property of the material, where the abnormal dispersion property $\Delta\theta gF$ is defined as a deviation from a reference line defined as a straight line connecting a coordinate point of a reference glass species: K7 (vd=60.49, θgF=0.5436) and a coordinate point of a reference glass species: F2 (vd=36.26, θgF=0.5828) on a two-dimensional coordinate having two orthogonal axes of a Y axis representing a partial dispersion ratio θgF and an X axis representing an Abbe number vd, and the partial dispersion ratio θgF is defined by the following relationship: θgF=(ng−nF)/(nF−nC), where ng represents a refraction index of Fraunhofer line to g line, nF represents a refraction index of Fraunhofer line to F line, and nC represents a refraction index of Fraunhofer line to C line.

It is still further preferable that, in the image forming lens mentioned above, an Abbe number vdp and an abnormal dispersion property ΔθgFp of the material of at least one of the positive lenses in the second F lens group satisfy the following relationships (8) and (9):

$$70 < vdp \quad \text{Relationship (8)}$$

$$0 < \Delta\theta gFp \quad \text{Relationship (9)}$$

It is still further preferable that, in the image forming lens mentioned above, the focal length f of the entire system and the focal length f2 of the second F lens group satisfy the following relationship (10):

$$0.2 < f/f2 < 0.5 \quad \text{Relationship (10)}$$

It is still further preferable that, in the image forming lens mentioned above, the focal length f of the entire system and the focal length f1 of the first lens group satisfy the following relationship (11):

$$|f1|/f > 8 \quad \text{Relationship (11)}$$

It is still further preferable that, in the image forming lens mentioned above, an Abbe number vdn1 and an abnormal dispersion property ΔθgFn1 of the material of at least one of the negative lenses in the second F lens group satisfy the following relationships (12) and (13):

$$70 < vdn1 \quad \text{Relationship (12)}$$

$$0 < \Delta\theta gFn1 \quad \text{Relationship (13)}$$

It is still further preferable that, in the image forming lens mentioned above, the second negative lens in the second F lens group is formed of the material satisfying the relationships (6) and (7):

It is still further preferable that, in the image forming lens mentioned above, the focal length f of the entire system, the focal length f1 of the first lens group, the focal length f2 of the second F lens group and the focal length f3 of the second R lens group satisfy the following relationships (14), (15) and (17):

$$0.2 < f/f2 < 0.5 \quad \text{Relationship (14)}$$

$$|f1|/f > 8.0 \quad \text{Relationship (16)}$$

$$0.3 > |f/f3| > 0.1 \quad \text{Relationship (17)}$$

It is still further preferable that, in the image forming lens mentioned above, the positive or negative focus synthesis length f21 of the first positive lens and the first negative lens in the second F lens and the focus synthesis length f22 of a positive cemented lens of the second negative lens and the second positive lens satisfy the following relationship (15):

$$|f22/f21| < 0.5 \quad \text{Relationship (15)}$$

It is still further preferable that, in the image forming lens mentioned above, the thickness T2f of the second F lens group, the thickness T1 of the first lens group, and the thickness T2r of the second R lens group satisfy the following relationship (18):

$$1 \geq T2f/(T1+T2r) > 0.1 \quad \text{Relationship (18)}$$

It is still further preferable that, in the image forming lens mentioned above, the first positive lens and the first negative lens in the second F lens group are cemented as a cemented lens.

As another aspect of the present invention, a camera device is provided which includes the camera body and the image forming lens mentioned above.

It is preferable that, in the camera device mentioned above, the image forming lens is retractable into the camera body and the second F lens group is retractable from an optical axis of the image forming lens when the image forming lens is retracted into the camera body.

As another aspect of the present invention, a handheld terminal is provided that includes the camera device mentioned above.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 6 is a graph illustrating aberration curve relating to Example 1;

FIG. 7 is a graph illustrating aberration curve relating to Example 2;

FIG. 8 is a graph illustrating aberration curve relating to Example 3;

FIG. 9 is a graph illustrating aberration curve relating to Example 4;

FIG. 17 is a diagram illustrating aberration of an indefinite object of the image forming lens of Example 6;

FIG. 18 is a diagram illustrating aberration of an indefinite object of the image forming lens of Example 7;

DETAILED DESCRIPTION OF THE INVENTION

Figure 1:
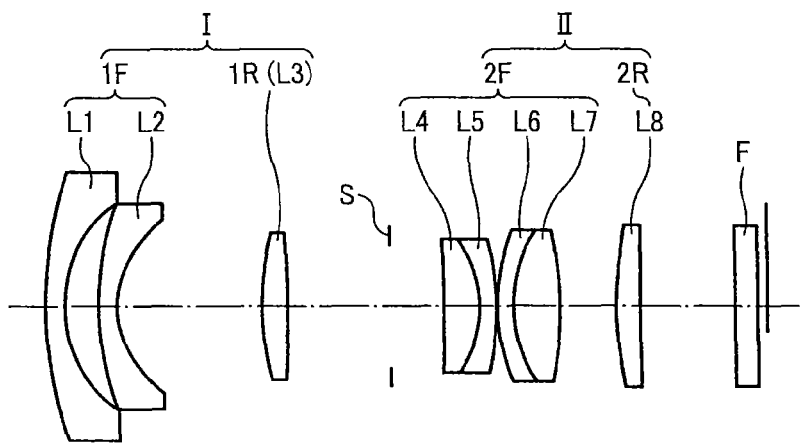
FIG. 1 is a cross-section illustrating a structure of the image forming lens of Example 1 described later.
Figure 2:
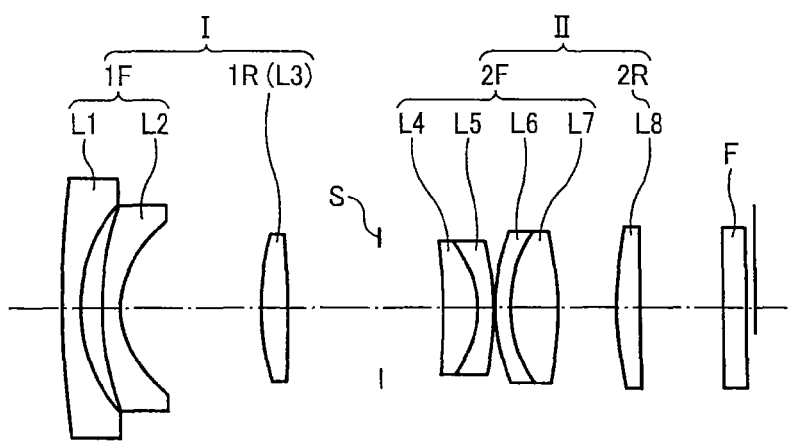
FIG. 2 is a cross-section illustrating a structure of the image forming lens of Example 2 described later.
Figure 3:
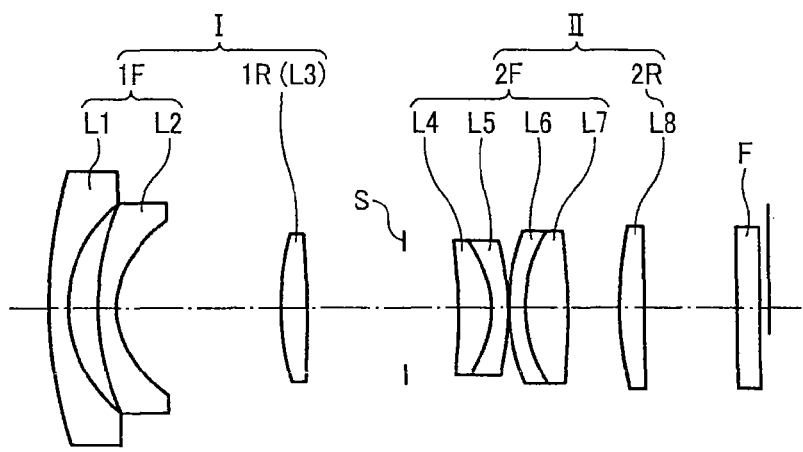
FIG. 3 is a cross-section illustrating a structure of the image forming lens of Example 3 described later.
Figure 4:
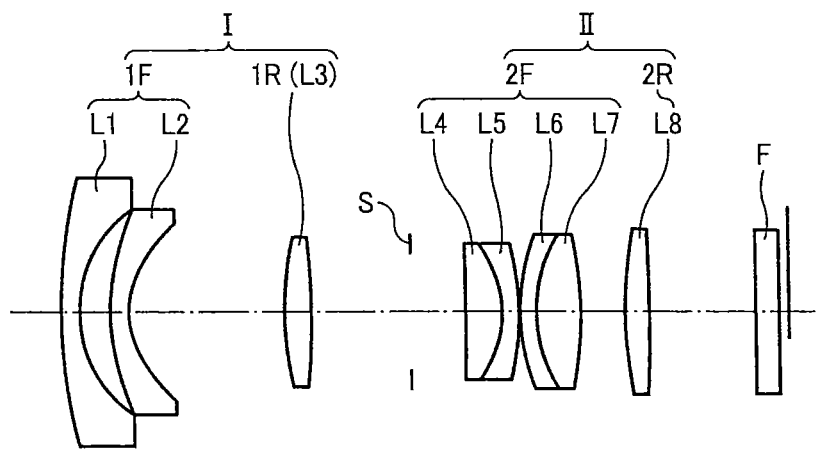
FIG. 4 is a cross-section illustrating a structure of the image forming lens of Example 4 described later.
Figure 5:
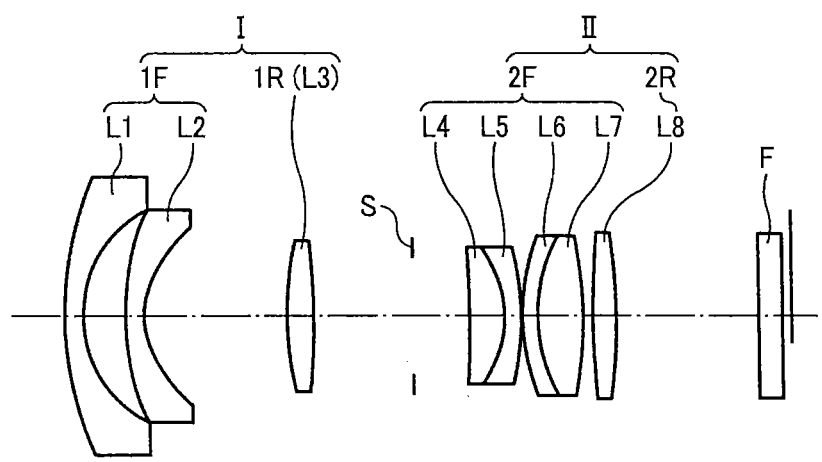
FIG. 5 is a cross-section illustrating a structure of the image forming lens of Example 5 described later.
Figure 10:
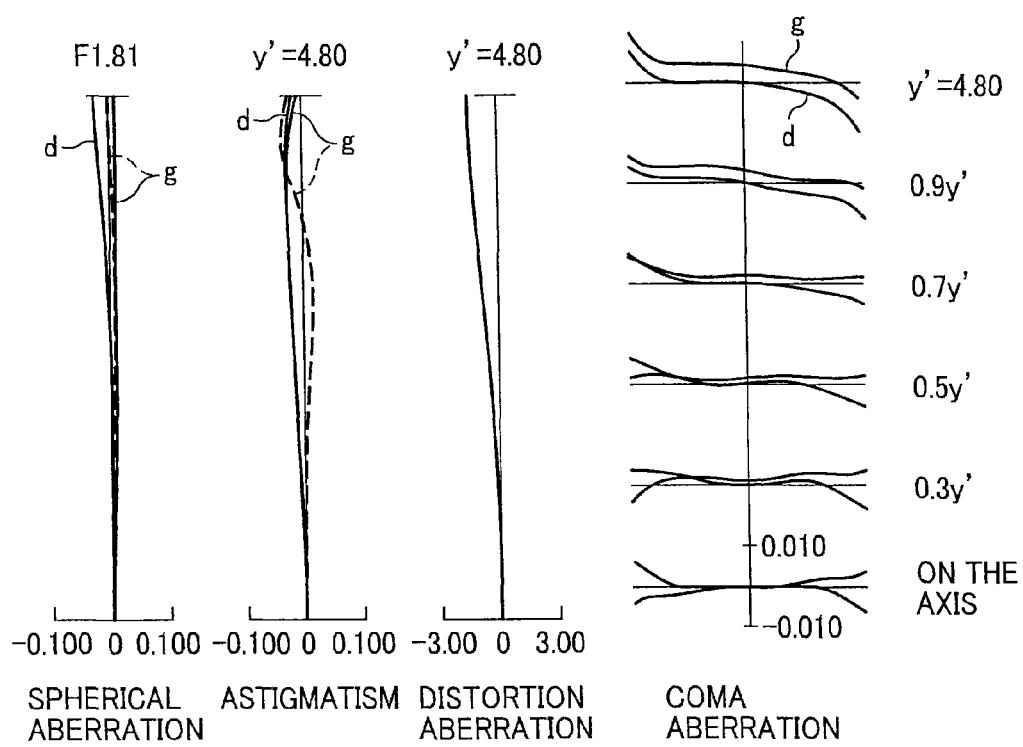
FIG. 10 is a graph illustrating aberration curve relating to Example 5.

The present invention will be described below in detail with reference to several embodiments and accompanying drawings.

The image forming lens of the present invention is an image forming lens having a short focal length suitably usable as a photo shooting lens for a digital camera and a digital video camera and is structured by an aperture stop, a first lens group arranged on the object side relative to the aperture stop, and a second lens group having a positive power arranged on the image side relative to the aperture stop.

The lens group arranged on the object side relative to the aperture stop is the first lens group and, the lens group arranged on the image side relative to the aperture stop is the second lens group.

The first lens group includes a first F lens group having a negative power, and a first R lens group having a positive power arranged in this sequence from the object side. The first F lens group and the first R element are positioned with the widest air gap (space) from each other in the first lens group.

That is, the gap between the lens surface in the first F lens group positioned closest to the image and the lens surface in the first R lens group positioned closest to the object is the widest in the first lens group.

The first F lens group has at least two negative lenses.

The first R lens group has at least one positive lens.

The second lens group is arranged on the image side relative to the aperture stop and includes a second F lens group and a second R lens group from the object side.

The second F lens group has a positive power and has an arrangement of a first positive lens, a first negative lens, a second negative lens, and a second positive lens in this sequence from the object side.

The second R lens group has one surface which is an aspheric surface having decreasing positive power from the optical axis toward the periphery.

The focal length f2F of the second F lens group and the focal length f2R of the second R lens group satisfy the following Relationship (1):

$$0.4 < f2F/f2R < 0.6 \qquad \text{Relationship (1)}.$$

In addition, the aspheric surface in the second R lens group satisfies the following relationship (2), $$0.3 < D1/D2 < 0.5 \qquad \text{Relationship (2)}$$

In the relationship (2), D2 represents a sag amount of the aspheric surface and a surface formed by a paraxial curvature radius at a position of an effective height of H2R of beams of light of the aspheric surface and D1 represents a sag amount of the aspheric surface and a surface formed by a paraxial curvature radius at a position 0.8×H2R.

The effective height of beams of light represents a distance in the direction vertical to the optical axis between the optical axis and the position where beams of light that pass through the position farthermost from the optical axis pass among the beams of light that pass through the lens surface to contribute to image focusing.

In the structure described above, the effective height of beams of light is H2R for the aspheric surface having a form of decreasing positive power from the optical axis toward the periphery in the second R element.

The sag amount of the aspheric surface and the surface formed by the radius of paraxial curvature of the aspheric surface (i.e., spherical surface having the radius of paraxial curvature as the curvature radius) is the distance between the spherical surface in the direction parallel to the optical axis and the aspheric surface at the position of the distance h where h represents the distance from the optical axis in the direction perpendicular to the optical axis.

The relationship (2) is satisfied by the sag amount D2 at the effective height of beam: H2R and the sag amount D1 at the distance from the optical axis: 0.8×H2R. When the relationship (2) is satisfied, D1<D2.

The sag amount increases as being away from the optical axis. This aspheric surface has a positive power and this positive power weakens as being away from the optical axis toward the periphery.

The image forming lens described above preferably satisfies the following relationship (3):

$$1.5 < D2F\_2R/Y' < 3.0 \qquad \text{Relationship (3)}$$

where D2F_2R represents the thickness from the lens surface of the second F lens group on the object side to the lens surface of the second R lens group on the image side and Y' represents the maximum image height.

The image forming lens described above preferably has one surface which is an aspheric surface having a form of decreasing negative power from the optical axis toward the periphery and the aspheric surface satisfies the following relationship (4).

When the effective height of beam of the aspheric surface of the first F lens group which has a form of decreasing negative power from the optical axis toward the periphery is defined as H1F, the relationship (4) is the following condition that regulates the sag amount D3 of the surface formed by the radius of paraxial curvature at the position of 0.7×H1F and the aspheric surface and the sag amount D4 of the surface formed by the radius of paraxial curvature at the position of 0.9×H1F and the aspheric surface.

$$0.1 < D3/D4 < 0.3 \quad \text{Relationship (4)}$$

In the image forming lens described above, the aspheric surface employed in the first F lens group has a form of decreasing a negative power from the optical axis toward the periphery while satisfying the relationship (4).

The image forming lens described above preferably has a structure in which the second R lens group is constituted by one aspheric lens.

The aspheric surface in the one aspheric lens constituting the second R lens group has a positive power which decreases from the optical axis toward the periphery while satisfying the relationship (2).

With regard to the image forming lens described above, the aspheric lens in the second R lens group is preferably made of a material satisfying the following relationship (5):

$$60 < vd < 96 \quad \text{Relationship (5)},$$

where vd represents Abbe number.

The image forming lens described above can have a structure in which the first F lens group in the first lens group is constituted by two negative lenses and the first R lens therein is constituted by one positive lens. The surface on the image side of the second negative lens of the first F lens group from the object side is an aspheric lens having a form of decreasing negative power from the optical axis toward the periphery. In the second F lens group of the second lens group, the first positive lens is cemented with the first negative lens, and the second negative lens is cemented with the second positive lens. In addition, the second R lens group is constituted by one positive lens and the surface thereof on the object side is set to be an aspheric surface having a form of decreasing positive power from the optical axis toward the periphery.

The image forming lens described above can perform focusing on an object at a finite distance by moving the second lens group.

The camera device of the present invention includes any of the image forming lens described above.

This camera device can be a silver salt camera and preferably a digital camera or a digital video camera having a function of changing a shot image into digital information.

In addition, such a camera device that has a function of a digital camera or a digital video camera is installed onto a handheld terminal as a photo shooting function unit.

The details are described below.

In the image forming lens of the present invention, the first lens group is arranged on the object side relative to the aperture stop, and, the second, the image side. This image forming lens is of a retrofocus type.

In general, a negative refraction power is arranged on the object side and a positive refraction power is arranged in an image forming lens of the retrofocus type. Due to this asymmetric diversity of the refraction power arrangement, distortion aberration and chromatic aberration of magnification, etc. easily occur. Therefore, reduction of such aberrations is a large issue.

In addition, difficulty on correction of coma aberration and color difference of coma aberration increases as the diameter of a lens increases.

The present invention is made by the present inventor because the present inventor has found that the aberrations described above is suitably corrected by the structure described above.

In the image forming lens of the present invention, the first lens group arranged on the object side relative to the aperture stop is considered to function as a kind of a wide converter added to the second lens group.

The negative refraction power (first F lens group) and the positive refraction power (first R lens group) are provided to the first lens group in this sequence from the object side. The space between these is set to be the widest in the first lens group to secure a sufficient image angle and correct various kinds of aberrations such as spherical aberration.

Since the first R lens group and the second F lens group are facing each other with the aperture stop therebetween, the coma aberration can be controlled by balance of the positive refraction powers of both.

In the image forming lens of the present invention, the second 2F lens plays a main part of the image focusing function and is most important lens group in terms of aberration correction.

The second F lens group is based on the refraction power arrangement of a triplet type, which is positive, negative and positive and the negative refraction power in the center of the triplet type is divided into two to obtain a structure of four of positive, negative, negative and positive.

Since the aperture stop is located on the object side relative to the second F lens group, the height of the oblique rays is different between a pair of the first positive lens and the first negative lens and a pair of the second negative lens and the second positive lens. Thereby, both color aberration on the axis and the chromatic aberration of magnification are significantly reduced.

Furthermore, the color difference of the coma aberration can be reduced using the designing flexibility of the second negative lens.

The second R lens group has a function of balancing aberrations and controlling the exit pupil distance. The positive refraction power of the second R lens group secures the exit pupil distance. In addition, coma aberration and field curvature is suitably corrected in particular by providing the aspheric surface described above to the second R lens group.

The relationship (1) is to make the second F lent element play a main part of the image focusing function in the image forming lens.

When the parameter f2F/f2R in the relationship (1) surpasses the upper limit, the refraction power of the second F lens group in the second lens group relatively becomes weak so that the second F lens group is difficult to play a main part of the image focusing function. As a result, the designing flexibility of the second F lens group is not fully utilized, which leads to insufficient aberration correction on the whole.

In addition, when the parameter f2F/f2R is lower than the lower limit of the relationship (1), it is difficult to correct aberrations while securing the exit pupil distance.

The relationship (2) is a condition under which coma aberration, field curvature, etc. can be sufficiently corrected at the intermediate image height and the peripheral image height. When the parameter D1/D2 is lower than the lower limit of the relationship (2), the curvature on the aspheric surface between the optical axis and the intermediate portion tends to be excessively small and the curvature between the intermediate portion and the periphery tends to be excessively great. When the parameter D1/D2 surpasses the upper limit, the curvature on the aspheric surface between the optical axis and the intermediate portion tends to be excessively great and the curvature between the intermediate portion and the periphery tends to be excessively small. Sufficient correction on the coma aberration, field curvature, etc. at the intermediate image height and the peripheral image height is difficult in both cases.

It is preferable that the parameter D1/D2 satisfy the following relationship (2A), which is relatively a tight condition in comparison with the relationship (2).

$$0.35 < D1/D2 < 0.45 \quad \text{Relationship (2A)}$$

The relationship (3) is a condition suitable for size reduction of an image forming lens and correction on coma aberration and field curvature. When the parameter D2F_2R/Y' surpasses the upper limit, the element length D2F_2R of the second lens group becomes excessively long, thereby preventing size reduction of the lens and in addition oblique ray that passes through the second R lens group becomes too thin to perform sufficient correction on coma aberration, field curvature, etc.

When the parameter D2F_2R/Y' is lower than the lower limit, oblique ray that passes through the second R lens group becomes too thick to perform sufficient correction on coma aberration, field curvature, etc.

An aspheric surface having a form of decreasing negative power from the optical axis toward the periphery that satisfies the relationship (4) is employed to sufficiently correct distortion aberration that tends to occur as the image angle widens and improve the performance.

When the parameter D3/D4 is lower than the lower limit of the relationship (4), the curvature on the aspheric surface between the optical axis and the intermediate portion tends to be excessively small and the curvature between the intermediate portion and the periphery tends to be excessively great. When the parameter D3/D4 surpasses the upper limit, the curvature on the aspheric surface between the optical axis and the intermediate portion tends to be excessively great and the curvature between the intermediate portion and the periphery tends to be excessively small. In both cases, it is difficult to sufficiently correct the distortion aberration, field curvature, etc. at the intermediate image height and the peripheral image height.

It is preferable that the parameter D3/D4 satisfy the following relationship (4A), which is relatively a tight condition in comparison with the relationship (4).

$$0.15 < D3/D4 < 0.3 \quad \text{Relationship (4A)}$$

In general, distortion aberration tends to occur to a lens having a wide image angle. This can be sufficiently corrected by the aspheric effect by making the surface having a large curvature aspheric.

From this point of view, the surface having the most concavity (the smallest curvature radius) in the first F lens group is suitable as the aspheric surface having a form of decreasing negative power from the optical axis toward the periphery that satisfies the relationship (4) and is employed for the first F lens group.

In addition, the designing flexibility is improved by employing an aspheric surface because a smaller curvature radius than the effective height of beams of light is obtained.

As described above, the structure of one aspheric surface for the first F lens group, one aspheric surface for the second R lens group and spheric surfaces for the other surfaces leads to cost reduction and relax on manufacturing difficulty caused by aspherication.

As described above, the structure of the second R lens group constituted by one aspheric lens is simple, which provides the second F lens group with a sufficient designing flexibility and contributes to the size reduction of the image forming lens.

As described above, the aspheric lens in the second R lens group made of a material satisfying the relationship (5) sufficiently restrains the chromatic aberration of magnification, and color coma aberration as a whole.

The image forming lens described above can perform focusing on an object at a definite distance by moving the second lens group.

This type of focusing system is advantages over a system of moving the entire image forming lens in terms that the weight of the moving portion is small, which leads to a high speed performance of focusing and energy saving.

In addition, when an image forming lens is incorporated into a camera as a photographic optical system that has a retraction mechanism to contract the space between each lens group and the back focus portion when not in use, the mechanism for storing the second lens group is conveniently used in common with the focusing mechanism.

Eccentricity can be preferably adjusted by shifting the first lens group, the second lens group and/or second R lens group.

The lens group shifted for adjustment can be particularly small by adjusting the impact of eccentricity, etc., by shifting the second R lens group.

As described above, according to the present invention, as described in Examples described later, high performance image forming lens is provided which has a wide half angle of about 38 degree and a large diameter with an f number of around 2.0 or less (meaning a relatively small size with a large diameter) while astigmatism, field curvature, chromatic aberration of magnification, color difference of coma aberration, and distortion aberration are sufficiently reduced to deal with a resolution corresponding to an image pick-up element of 10,000,000 to 20,000,000 pixels with less coma flares when the aperture stop is fully open, less point image collapses to the periphery of the field angle of view under high contrast, less chromatic aberration resulting in no un-needed coloring in a portion having a large luminance difference, and less distortion aberration under which a straight line can be depicted as a straight line without distortion. In addition, a small-sized and high performance camera device and handheld terminal using the image forming lens are provided.

The image forming lens of the present invention has a single focal length and other example structures thereof are as follows:

The image forming lens has a first lens group provided on the object side and a second lens group on the image side with the aperture stop therebetween.

Accordingly, the first lens group and the second lens group are separated relative to the aperture stop.

The first lens group is structured to have a first F lens group on the object side and a first R lens group on the aperture stop side. The first F lens group and the first R lens group are arranged with the widest air space in the firs lens group.

The first F lens group has at least two negative e lenses and the first R lens group has at least one positive lens. That is, the first lens group is structured with three lenses of two negative lens and one positive lens at minimum.

The first F lens group has a negative refraction power, and the first R element has a positive refraction power.

The second lens group is structured to have a second F lens group and a second R lens group in this sequence from the aperture stop side.

The second F lens group has a positive refraction power and has an arrangement of a first positive lens, a first negative lens, a second negative lens, and a second positive lens in this sequence from the aperture stop side. That is, the second F lens is constituted by four lenses of two positive lenses and two negative lenses with a sequence of positive, negative, negative and positive lens.

The second R lens group has at least one positive lens or one negative lens.

The image forming lens described above has characteristics as follows in such a structure.

At least one of the two negative lenses (first negative lens and second negative lens) contained in the second F lens group is made of a material having an Abbe number satisfying the following relationships (6) and (7):

$$30 < \nu dn < 41 \qquad \text{Relationship (6)}$$

$$\Delta\theta gFn < 0 \qquad \text{Relationship (7)}$$

where $\nu dn$ represents Abbe number and $\Delta\theta gFn$ represents abnormal dispersion property.

Both of the two negative lenses contained in the second F lens group may simultaneously satisfy the relationships (6) and (7).

"n" is attached at the end of "$\nu dn$" representing Abbe number to clarify the material is related to a negative lens.

"n" is also attached at the end of "$\Delta\theta gFn$" representing abnormal dispersion property to clarify the material is related to a negative lens.

Abnormal dispersion property $\Delta\theta gFn$ is defined as follows:

The partial dispersion ratio: $\theta gF$ is defined by the following relationship:

$$\theta gF = (ng - nF)/(nF - nC),$$

where ng represents the refraction index of Fraunhofer lines to g lines, nF represents the refraction index of Fraunhofer lines to F lines, and nC represents the refraction index of Fraunhofer lines to C lines.

Assume a two-dimensional coordinate having two orthogonal axes of a Y axis representing the partial dispersion ratio $\theta gF$ and an X axis representing Abbe number vd defined above.

A straight line connecting the coordinate of the reference glass species: K7 (vd=60.49, $\theta gF$=0.5436) and the coordinate of the reference glass species: F2 (vd=36.26, $\theta gF$=0.5828) on the two dimensional coordinate is referred to as the reference line.

The standard deviation of the partial dispersion ratio $\theta gF$ of the glass species from the reference line on the two dimensional coordinate is the abnormal dispersion property: $\Delta\theta gF$.

The reference glass species (materials) K7 and F2 are both glass species available from Ohara Inc. and the names of the products are NSL7 and PBM2, respectively.

The deviation from the reference line is the length of a straight line drawn from an arbitrary coordinate (vd, $\theta gF$) on the two dimensional coordinate to the reference line in parallel with a Y axis (partial dispersion ratio: $\theta gF$). The length along the positive direction of the Y axis is defined as plus when measured from the reference line and, the length along the negative direction, minus.

The image forming lens described above preferably satisfies the following relationships (8) and (9).

That is, at least one of the two positive lenses (first positive lens and second positive lens) contained in the second F lens group is made of a material having an Abbe number satisfying the following relationships (8) and (9):

$$70 < \nu dp \qquad \text{Relationship (8)}$$

$$0 < \Delta\theta gFp \qquad \text{Relationship (9),}$$

where $\nu dp$ represents Abbe number and $\Delta\theta gFp$ represents abnormal dispersion property.

Both of the two positive lenses contained in the second F lens group may simultaneously satisfy the relationships (8) and (9). "p" is attached at the end of $\nu dp$ representing Abbe number and $\Delta\theta gFp$ representing abnormal dispersion property to clarify the material is related to a positive lens.

The image forming lens described above satisfies the following relationship (10):

$$0.2 < f/f2 < 0.5 \qquad \text{Relationship (10),}$$

where f represents the focal length of the entire system and f2 represents the focal length of the second F lens group.

The image forming lens described above preferably satisfies the following relationship (11).

$$|f1|/f > 8 \qquad \text{Relationship (11),}$$

where f represents the focal length of the entire system and f1 represents the focal length of the first lens group.

At least one negative lens of the at least two negative lenses contained in the first F lens group in any one of the image forming lens described above is preferably made of a material satisfying the following relationship (12).

$$70 < \nu dn1 \qquad \text{Relationship (12)}$$

$$0 < \Delta\theta gFn1 \qquad \text{Relationship (13),}$$

where $\nu dn1$ represents Abbe number and $\Delta\theta gFn1$ represents abnormal dispersion property.

Both of the two negative lenses contained in the first F lens group may simultaneously satisfy the relationships (12) and (13).

"n1" is attached at the end of Abbe number $\nu dn1$ and abnormal dispersion property $\Delta\theta gFn1$ to clarify the material is related to a negative lens in the first F lens group.

The second negative lens of the two negative lenses in the second F lens group in any one of the image forming lenses described above is made of a material satisfying the relationships (6) and (7).

$$30 < \nu dn < 41 \qquad \text{Relationship (6)}$$

$$\Delta\theta gFn < 0 \qquad \text{Relationship (7)}$$

The first negative lens in the second F lens group may satisfy the relationships (6) and (7).

That is, in the image forming lens, at least one negative lens that satisfies the relationships (6) and (7) among the two negative lenses (first negative lens and second negative lens) is preferably the second negative lens.

The second negative lens and the second positive lens are preferably cemented in the second F lens group in the image forming lenses described above.

In addition, the first negative lens in the second F lens group in the photographic optical system described above is preferably a negative meniscus lens with the convex surface directed toward the image side.

The image forming lens described above can perform focusing from indefinite to a close range by moving part of or entire of the second lens group.

The camera device of the present invention includes the image forming lens described above as the photographic optical system.

As described in Examples described later, the image forming lens having a single focal length with high performance is provided according to the present invention.

Such high performance image forming lens can be suitably used as not only for a photo shooting lens for a silver salt camera or an optical system for use in an optical sensor bus also for a camera device having a function of converting image information into digital information, i.e. a digital camera.

The camera device can be used as a camera mechanism in a handheld terminal.

The details are described below.

As described above, the image forming lens of the retrofocus type in which a negative refraction power is arranged on the object side has a large issue of reduction of aberration such as distortion aberration, chromatic aberration of magnification, etc. stemming from asymmetry arrangement of refraction power.

In addition, due to the difficulty on correction of coma aberration and color difference of coma aberration, problems to be solved are piled up.

The image forming lens of the present invention is made by the present inventor because the present inventor has found that the aberrations issue described above is suitably solved by the structure described above.

In the image forming lens of the present invention, the first lens group is considered to function as a kind of a wide converter added to the second lens group.

The first lens group is structured to have a negative refraction power (i.e., the first F lens group) on the object side and a positive refraction power (i.e., the first R lens group) on the aperture stop side. The positive and negative refraction powers are arranged with a relatively wide space therebetween (i.e., the space between the first F lens group and the first R lens group on the optical axis, which is the widest in the first lens group) to have a good combination of a sufficient image angle and correction on aberrations such as spherical aberration.

The first R lens group is configured to face the second F lens group via the aperture stop and thus, the coma aberration is controlled by balance of the positive refraction power of both.

One of the characteristics of the present invention is the function and configuration of the second F lens.

In the image forming lens of the present invention, the second F lens plays a main part of the image forming function and is most important lens group in terms of correction on the aberration.

The second F lens group is based on the refraction power arrangement of a triplet type, which is positive, negative and positive and the negative refraction power situated in the center is divided into two negative lenses to obtain a four lens structure of positive, negative, negative and positive.

Since the aperture stop is located on the object side relative to the second F lens group, the height of the oblique ray is different between a pair of the first positive lens and the first negative lens and a pair of the second negative lens and the second positive lens. Thereby, both longitudinal chromatic aberration and the chromatic aberration of magnification are significantly reduced.

When the second F lens group is used as a normal triplet type of positive, negative and positive, the positive power balance in the vicinity of the negative lens tends to directly affect the distortion aberration. With regard to the image forming lens of the present invention, the aperture stop is arranged on the object side of the second F lens group. Therefore, the positive power balance in the vicinity of the first negative lens tends not to directly affect the distortion aberration, which increases the flexibility for correction on coma aberration and reduction on eccentricity sensitivity.

The lens material satisfying the relationships (6) and (7) is glass species having a refraction index change due to a wavelength in the range including C line and g line which is relatively close to linear. By employing such glass species for at least one of the negative lenses in the second F lens group playing a main part of image forming function in the image forming lens system, deterioration of chromatic aberration caused by secondary spectrum is reduced and longitudinal chromatic aberration and chromatic aberration of magnification is corrected.

When the second F lens group includes no negative lens satisfying the upper limit of the relationship (7), chromatic aberration of magnification caused by secondary spectrum, for example, chromatic aberration of magnification of g line resulting from achromation by F line and C line, may not be sufficiently corrected.

When the second F lens group includes no negative lens made of a material satisfying the lower limit of the relationship (6), the dispersion of the negative lens in the second F lens group tends to increase, which makes it difficult to balance correction on chromatic aberration of F line and C line and correction on other aberrations such as spherical aberration, coma aberration, astigmatism, and field curvature.

When the second F lens group includes no negative lens made of a material satisfying the upper limit of the relationship (6), correction on chromatic aberration of F line and C line tends to be insufficient, which leads to degradation of the quality of a formed image on the whole.

When the correction on the longitudinal chromatic aberration is insufficient, color flare tends to occur all over a formed image, thereby reducing the contrast. When the correction on the chromatic aberration of magnification is insufficient, coloring of blue purple referred to as purple fringe tends to occur at the periphery of a formed image and color flare easily occurs, which degrades the quality of image.

The second R lens group has a function of balancing aberrations and controlling the exit pupil distance.

The exit pupil distance is effectively secured when the second R lens group has a positive refraction power. However, if a short exit pupil distance is allowed, the entire length of the lens system can be shortened by making the second R lens group have a negative refraction power.

The second R lens group can be configured to have at least one positive lens or one negative lens.

According to the configuration of the image forming lens, as described above, the aberration of the image forming lens can be significantly corrected to achieve an extremely high image performance while satisfying tight conditions of a wide image angle of about 38 degree and a large diameter of f number of about 2.0 or less.

To obtain a lens system having a higher performance than this, as described above, it is good to contain at least one positive lens made of a material satisfying the relationships (8) and (9) in the second F lens group.

The glass species satisfying the relationship (9) has a relatively small refraction index change, which is caused by a wavelength in the range containing C line to F line. The glass species satisfying the relationship (8) has a relatively large refraction index change from the vicinity of g line.

When at least one positive lens made of a material satisfying the relationships (8) and (9) is included in the second F lens group, chromatic aberration by secondary spectrum can be corrected while reducing the affection on the correction on chromatic aberration.

When the second F lens group includes no positive lens made of a material satisfying the lower limit of the relationship (9), the glass species of the two positive lenses contained in the second F lens group has a negative abnormal dispersion property. Therefore, the chromatic aberration due to the secondary spectrum, for example, chromatic aberration of g line for achromation with F line and C line, tends not to be sufficiently corrected.

When the second F lens group includes no positive lens made of a material satisfying the lower limit of the relationship (8), correction on longitudinal chromatic aberration of F line and C line tends to be insufficient, which leads to degradation of the quality of a formed image on the whole.

It is more preferable to contain at least one positive lens satisfying the following relationships (8A) and (9A):

$$80 < \nu dp \quad \text{Relationship (8A)}$$

$$0.02 < \Delta\theta gFp \quad \text{Relationship (9A),}$$

Both two positive lenses in the second F lens group preferably satisfy the relationships (8) and (9) or (8A) and (9A).

The image forming lens has a higher performance when the relationship (10) is satisfied.

When the image forming lens is lower than the lower limit of the relationship (10), the positive power of the second F lens tends to be relatively small in the entire system so that the impact of the image formation function by the second F lens group relatively decreases in the entire system, thereby reducing the effect of the image forming lens containing the second F lens group. Therefore, the image forming lens is difficult to maintain high performance while satisfying the tight condition of a wide image angle and a large diameter.

When the image forming lens surpasses the upper limit of the relationship (10), the positive power of the second F lens group tends to be relatively large in the entire system so that the impact of the image formation function by the second F lens group relatively increases in the entire system. Therefore, trade-off among aberrations such as spheric aberration is excessive, which leads to a demand for an extremely high accuracy on eccentricity of a lens and air space (gap).

When the first lens group has a positive refraction power, and the parameter of the relationship (11) is lower than the lower limit, the positive refraction power of the first lens group tends to increase and thus the image formation function of the second lens group relatively weakens, thereby relatively weakening the aberration correction function of the second F lens. Therefore, the image forming lens is difficult to effectively reduce both longitudinal chromatic aberration and chromatic aberration of magnification.

When the first lens group has a negative refraction power, and the parameter of the relationship (11) is lower than the lower limit, the negative refraction power of the first lens group tends to increase and thus marginal beams of light on the optical axis that passes through the second F lens group is excessive. Therefore, it is difficult to have an image forming lens system having a compact structure and the diameter of stop tends to be large.

Furthermore, the positive power of the second lens group is required to be relatively large, resulting in an increase in the curvature of an image surface and deterioration of negative distortion aberration.

Irrespective of the sign of the first lens group, when the parameter of the relationship (11) is lower than the lower limit, trade-off among aberrations in the first lens group such as spheric aberration is excessive, which leads to a demand for an extremely high accuracy on eccentricity of a lens and air space (gap).

The numerator f1 of the parameter |f1|/f of the relationship (11) can be positive or negative depending on the sign of the refraction power of the first lens group.

When the first lens group has a negative refraction power, the positive refraction power of the second lens group is required to be relatively large. Therefore, as described above, the field curvature tends to increase and a negative distortion aberration easily worsens.

Each aberration is greatly traded off in each surface in the second F lens group to reduce the aberration amount in the end. When the first lens group has a negative refraction power, the sensitivity on manufacturing error of the second F lens group tends to be high.

From this point of view, the refraction power of the first lens group is preferably positive, and then the relationship (11) is as follows.

$$f1/f > 8 \quad \text{Relationship (11A).}$$

In addition, the parameter f1/f preferably satisfies the relationship (11B) instead of Relationship (11A):

$$f1/f > 10 \quad \text{Relationship (11B),}$$

To improve the performance of the image forming lens, it is preferable to include at least one negative lens made of a material satisfying the relationships (12) and (13) in the first F lens group.

The glass species that satisfies the relationships (12) and (13) has a relatively small refraction index change, which is caused by a wavelength in the range containing C line to F line and a relatively large refraction index change from the vicinity of g line. By employing such a material for at least one negative lens in the first F lens group having a relatively large refraction power and using a wide air space (the widest space in the first F lens group) between the first F lens group and the first R lens group to correct the aberration of the first R lens group and other lens groups, the chromatic aberration in the vicinity of g line as the secondary spectrum can be corrected by a combination of the positive lens and the negative lens in the second F lens group as described above while suppressing an increase in the chromatic aberration in the range of wavelength including C line to F line. Therefore, performance of the correction on the aberration in the first lens group is improved.

In addition, it is preferable that the negative lens made of the glass species satisfying the following relationships (12A) and (13A) instead of the relationships (12) and (13) while simultaneously satisfying the relationships (6) and (7) at least includes the second negative lens in the second F lens.

$$80 < \nu dn1 \quad \text{Relationship (12A)}$$

$$0.02 < \Delta\theta gFn1 \quad \text{Relationship (13A),}$$

In the second F lens group, the oblique ray passing through the second negative lens relatively distant from the aperture stop is positioned higher than the oblique ray passing through the first negative lens. The chromatic aberration of magnification is suitably corrected by a pair of the second negative lens and the second positive lens by making the second negative lens satisfy the relationships (6) and (8)

Each aberration is greatly traded off in each surface in the second F lens group to reduce the aberration amount in the end and thus the sensitivity on manufacturing error tends to be high. By cementing the second negative lens and the second positive lens in the second F lens group as described above, the sensitivity on manufacturing error is substantially reduced so that the performance is stabilized.

In addition, it leads to reduce the number of parts that holds a lens barrel.

The performance is easily stabilized by substantially reducing the sensitivity on manufacturing error by cementing the first negative lens and the first positive lens, which leads to reduction on the number of parts that holds a lens barrel. Furthermore, as in the case of Examples described later, the performance is further stabilized with ease by furthermore substantially reducing the sensitivity on manufacturing error by cementing the first negative lens and the first positive lens in addition to the second negative lens and the second positive lens.

When a meniscus lens with its convex surface directed toward the image side is used for the first negative lens in the second F lens, the variation of the angle of incidence and the angle of emergence of oblique rays at the surface on the object side and the surface on the image side of the first negative lens in the second F lens group can be reduced. Therefore, the role of correcting longitudinal chromatic aberration by the pair of the first positive lens and the first negative lens in the second F lens group can be furthermore improved.

In addition, by correcting the chromatic aberration of magnification mainly by the pair of the second negative lens and the second positive lens, the roles of correcting the longitudinal chromatic aberration and the chromatic aberration of magnification are shared by the two pairs. Therefore, the flexibility for the aberration correction is improved.

A focusing system in which the entire or partially moving the second lens group to conduct focusing from the infinity to the close range is advantages over a system of moving the entire image forming lens in terms of the weight of the moving portion, which leads to a high speed performance of focusing and energy saving.

In addition, when the image forming lens of the present invention is incorporated into a camera device as a photographic optical system that has a retraction mechanism to contract the space between each lens group and the back focus portion when not in use, it is advantageous that the mechanism for storing the second lens group is used in common with the focusing mechanism.

The height variation of the marginal beams of light on the optical axis that passes through the surface of the lens situated closest to an object among the second lens group is kept small by making the focal length of the first lens group relatively long, which results in prevention of deterioration of performance.

As described in Examples described later, according to the present invention, high performance image forming lens is provided which has a wide half angle of about 38 degree or more and a large diameter with an f number of around 2.0 or less (meaning a relatively small size with a large diameter) while astigmatism, field curvature, chromatic aberration of magnification, color difference of coma aberration, and distortion aberration are sufficiently reduced to deal with a resolution corresponding to an image pick-up element of 10 million to 20 million pixels with less coma flares when the aperture stop is fully open, less point image collapses to the periphery of the field angle of view under high contrast, less chromatic aberration resulting in no un-needed coloring in a portion having a large luminance difference, and less distortion aberration under which a straight line can be depicted as a straight line without distortion.

Therefore, high performance camera device and a handheld terminal are provided by using the image forming lens as the photo shooting lens.

The image forming lens of the present invention is an image forming lens having a single focal distance which is suitably used as a photographic optical system for a digital camera, a digital video camera, a handheld terminal, etc.

That is, the image forming lens includes an aperture stop, a first lens group arranged on the object side relative to the aperture stop, and a second lens group having a positive power arranged on the image side relative to the aperture stop.

The lens group arranged on the object side relative to the aperture stop is the first lens group and, the image side, the second lens group.

The first lens group includes a first F lens group having a negative power, and a first R lens group having a positive power arranged from the object side. The first F lens group and the first R element are positioned with the widest air space (gap) from each other in the first lens group.

That is, the space between the lens surface in the first F lens group positioned closest to the image and the lens surface in the first R lens group positioned closest to the object is the widest in the first lens group.

The first F lens group has at least two negative lenses. The first R lens group has at least one positive lens.

The second lens group is arranged on the image side relative to the aperture stop and includes a second F lens group and a second R lens group from the object side.

The second lens group has a positive power as an entire system with an arrangement of a first positive lens, a first negative lens, a second negative lens, and a second positive lens in this sequence from the object side.

The first lens and the first negative lens have positive or negative focus synthesis length and the second positive lens and the second negative lens are cemented as a positive cemented lens.

That is, the second F lens group has a positive power as the entire system by
a positive or negative synthesis power by the first positive lens and the first negative lens and a positive synthesis power by the positive cemented lens formed of the second negative lens and the second positive lens.

The second R lens group has at least one positive lens.

The image forming lens described above preferably satisfies the following relationships (14), (16), and (17):

$$0.2 < f/f2 < 0.5 \qquad \text{Relationship (14)},$$

$$|f1|/f > 8.0 \qquad \text{Relationship (16)},$$

$$0.3 > |f/f3| > 0.1 \qquad \text{Relationship (17)},$$

where f represents the focal length of the entire system, f1 represents the focal length of first lens group, f2 represents the focal length of the second F lens group, and f3 represents the focal length of the second R lens group.

The image forming lens described above preferably satisfies the following relationship (15) about the positive or negative focus synthesis length f21 of the first positive lens and the first negative lens and the focus synthesis length f22 of the positive cemented lens.

$$|f22/f21| < 0.5 \qquad \text{Relationship (15)},$$

The sign of the focus synthesis length f22 depends on the magnitude relation between the negative and the positive power of the first positive lens and the first negative lens.

The image forming lens described above preferably satisfies the following relationship (18) about a thickness T2f of the second F lens group, a thickness T1 of the first lens group, and a thickness T2r of the second R lens group.

$$1 \geq T2f/(T1+T2r) > 0.1 \qquad \text{Relationship (18)}$$

In addition, the first negative lens in the second F lens group is preferably a meniscus lens with the convex surface directed toward the image side.

The first positive lens and the first negative lens in the second F lens group can be cemented.

The image forming lens described above preferably performs focusing from indefinite to a close range by moving part of or entire of the second lens group.

The camera device of the present invention includes the image forming lens described above.

This camera device can be a silver salt camera and preferably a digital camera or a digital video camera having a function of changing a shot image into digital information.

The handheld terminal of the present invention has the camera device as the photo shooting function unit.

The camera device preferably has a retraction mechanism in which the photographic optical system (the image forming lens) is retractable into the camera body and the second F lens group therein is retractable from the optical axis.

The handheld terminal preferably has a retraction mechanism in which the photographic optical system (the image forming lens) is retractable into the camera body and the second F lens group therein is retractable from the optical axis.

That is, in the camera device and the handheld terminal, the second F lens group is positioned on the same optical axis aligned with the other lens groups when an image is taken and retracted from the optical axis and then into the camera body when not in use (retraction mode). Thereafter, the first lens group is moved to the space the second F lens occupied and then retracted into the camera body.

That is, the second F lens group that is retractable from the optical axis means that the second F lens group retracted from the optical axis does not obstruct retraction of the other lens groups into the camera body.

The details are added below.

As described above, size reduction and wide image angle are strongly demanded for a digital camera and a digital video camera. In addition, a large lens diameter is also demanded without having a negative impact on the size reduction and wide image angle.

Generally, as the lens diameter increases, the photographic optical system tends to be longer because aberration of the beams of light to be corrected increases.

In the image forming lens of the present invention, the first lens group is arranged on the object side relative to the aperture stop, and, the second, the image side. This image forming lens is of a retrofocus type.

As described above, a negative refraction power is arranged on the object side and a positive refraction power is typically arranged in an image forming lens of the retrofocus type. Due to this asymmetric diversity of the refraction power arrangement, distortion aberration and chromatic aberration of magnification easily occur. Therefore, reduction of such aberrations is a large issue.

In addition, difficulty on correction of coma aberration and color difference of coma aberration increases as the diameter of a lens increases.

The image forming lens of the present invention is made by the present inventor because the present inventor has found that the aberrations described above is suitably corrected by the configuration described above.

In the image forming lens of the present invention, the first lens group arranged on the object side relative to the aperture stop is considered to function as a kind of a wide converter added to the second lens group.

The negative refraction power (first F lens group) and the positive refraction power (first R lens group) are provided in the first lens group in this sequence from the object side. The space between these is made to be the widest in the first lens group to secure a sufficient image angle and correct various kinds of aberrations such as spherical aberration.

Since the first R lens group and the second F lens group are facing each other with the aperture stop therebetween, the coma aberration can be controlled by balance of the positive refraction power in the vicinity of the aperture stop.

In the image forming lens of the present invention, the second 2F lens plays a main part of the image focusing function and is most important lens group in terms of correction of the aberration.

The second F lens group is based on the refraction power arrangement of a triplet type, which is positive, negative and positive and the last positive refraction power of the triplet type is a positive cemented lens formed by the second negative lens and the second positive lens. Thus, a Tessar type of positive, negative and positive is formed as the entire second F lens.

Since the aperture stop is provided on the object side relative to the second F lens group, the height of the oblique ray is different between a pair of the first positive lens and the first negative lens and a pair of the second negative lens and the second positive lens. Thereby, both longitudinal chromatic aberration and chromatic aberration of magnification are significantly reduced.

In addition, the positive power balance in the vicinity of the negative lens in the positive, negative and positive arrangement in a typical Tessar type tends to directly affect distortion aberration. On the other hand, with regard to the image forming lens of the present invention, since the aperture stop is provided on the object side relative to the second F lens, the positive power balance in the vicinity of the first negative lens does not affect the distortion aberration directly, which increases the designing flexibility for correcting coma aberration and reducing eccentricity sensitivity.

Furthermore, the color difference of the coma aberration can be reduced using the designing flexibility of the second negative lens.

The second R lens group has a function of balancing aberrations and controlling exit pupil distance. The exit pupil distance is effectively secured when the second R lens group has a positive refraction power. However, if a short exit pupil distance is allowed, the entire length of the lens system can be shortened by making the second R lens group have a negative refraction power.

According to the configuration described above, aberration can be significantly corrected and thus, an extremely high image performance can be achieved under a tight condition of a half angle of about 38 degree and a large lens diameter of about f number 2.0 or less.

As described above, in the image forming lens described above, the second F lens group is set as the most significant lens group in terms of aberration correction and plays a main role of image formation function.

The relationship (14) is the condition for securing the main role of image formation function for the second F lens group. When the parameter f/f2 is lower than the power limit of the relationship (14), contribution of the second F lens group as a main role of the image formation function tends to be not sufficient in the entire photographic optical system, meaning that the significance of the second F lens group decreases, which makes it difficult to maintain high performance under the tight condition of a wide image angle and a large lens diameter.

When the parameter f/f2 is lower than the upper limit of the relationship (14), contribution of the second F lens group as a main role of the image formation function tends to be excessive in the entire photographic optical system, which leads to a demand for an extremely high accuracy on eccentricity of a lens and air space (gap). Thus, highly accurate assembly is required for the photographic optical system, which invites a manufacturing problem.

Furthermore, in a camera device and a handheld terminal using the photographic optical system, the second F lens group is retracted from the optical axis when the lens group is contracted. When the second F lens group is outside the range of the relationship (14), it is likely that it is difficult to constitute the second F lens group as a retractable lens group.

The relationship (16) is a condition for balancing the functions of the second F lens group and the first lens group.

"f1 (focal length of the first F lens group)" in the parameter |f1|/f can be positive or negative. When the refraction power of the first F lens group is positive (f1>0) and the parameter |f1|/f is lower than the lower limit of the relationship (16), the positive refraction power of the first F lens group is relatively small in comparison with the entire refraction power. Accordingly, the image formation function of the second F lens group becomes relatively weak and thus the role of aberration correction thereof in the entire system is relatively small, which makes it difficult to reduce both longitudinal chromatic aberration and chromatic aberration of magnification.

In addition, when the refraction power of the first F lens group is negative (f1<0) and the parameter |f1|/f is lower than the lower limit of the relationship (16), the marginal beams of light on the optical axis that passes the second F lens group tends to be high. Accordingly, the effective diameter of the second F lens is excessive, which makes it difficult to reduce the photographic optical system in size.

Furthermore, the diameter of the aperture stop is excessively large.

Furthermore, the refraction power of the second lens group is required to be relatively strong, which easily increases the field curvature and worsens negative distortion aberration.

Irrespective of the sign of the first lens group, when the parameter of the relationship (16) is lower than the lower limit, trade-off among aberrations in the first lens group such as spheric aberration tends to be excessive, which leads to a demand for an extremely high accuracy on eccentricity between lenses and air space (gap).

When the power of the first lens group is negative, the refraction power of the second lens group is required to be relatively strong. Thus, when the positive refraction power of the second F lens group is strong, the field curvature easily increases and negative distortion aberration tends to worsen. Therefore, the first F lens group is preferably positive and satisfies the following relationship (16A).

$f1/f > 8.0$            Relationship (16A).

The relationship (17) is a condition for making the role balance between the second F lens and the second R lens in the second lens group good.

When the parameter |f/f3| surpasses the upper limit of the relationship (17), the power of the second R lens group increases excessively in the entire system irrespective of the sign of the refraction power of the second R lens. Thus, trade-off among aberrations such as spheric aberration with the second F lens group tends to be excessive. This leads to an increase in the sensitivity on the eccentricity between the second F lens group and the second R lens group. Thus, highly accurate assembly of the photographic optical system is required, which invites a manufacturing problem.

In addition, when the refraction power of the second R lens group is positive, and the parameter |f1|/f3| is lower than the lower limit of the relationship (17), the image formation function of the second F lens group becomes relatively weak and thus the role of aberration correction thereof in the entire system is relatively small, which makes it difficult to reduce both longitudinal chromatic aberration and chromatic aberration of magnification.

When the relationship (15) is satisfied while the relationships (14), (16) and (17) are satisfied, the performance is furthermore improved.

In the second F lens group, by making the focal length f22 of the positive cemented lens (cemented lens having a positive power as the entire lens) formed of the second negative lens and the second positive lens shorter than the focus synthesis length f21 of the first positive lens and the first negative lens, the oblique ray passes through a higher position of the positive cemented lens formed of the second negative lens and the second positive lens. Therefore, both longitudinal chromatic aberration and chromatic aberration of magnification are significantly reduced, thereby improving the designing flexibility for the aberration correction.

When the focus synthesis length f21 of the first positive lens and the first negative lens in the second F lens group is positive, and the parameter |f22/f21| of the relationship (15) surpasses the upper limit, the difference in the oblique rays between the pair of the first positive lens and the first negative lens and the pair of the second negative lens and the second positive lens (positive cemented lens) in the second F lens group tends to be small. Accordingly, reduction of both longitudinal chromatic aberration and chromatic aberration of magnification is difficult, which degrades the designing flexibility and results in insufficient correction of chromatic aberration.

When the focus synthesis length f21 of the first positive lens and the first negative lens in the second F lens group is negative, and the parameter |f22/f21| of the relationship (15) surpasses the upper limit, the negative power synthesized by the first positive lens and the first negative lens easily increases. Therefore, the oblique ray at the positive cemented lens of the second negative lens and the second positive lens is high. Thus, the size of the positive cemented lens tends to increase.

In addition, trade-off among aberrations in the first lens group between the pair of the first positive lens and the first negative lens and the pair of the second negative lens and the second positive lens tends to be excessive, which leads to a demand for an extremely high accuracy on eccentricity of lenses and air space (gap).

The parameter |f22/f21| preferably satisfies the relationship (15A) instead of the relationship (15).

$|f22/f21| < 0.25$            Relationship (15A).

The relationship (18) is a condition suitable for retracting the second F lens group from the optical axis when the lens group is contained by a retraction mechanism.

The denominator of the relationship (18) is the result obtained by subtracting the thickness of the second F lens group from the sum of the thickness of the first lens group and the second R lens group and the numerator is the thickness of the second F lens group.

The parameter T2f/(T1 f T2r) that surpasses the upper limit of the relationship (18) means that the thickness of the second F lens group retractable from the optical axis is greater than the sum (denominator) of the thickness of the first lens group and the thickness of the second R lens group. That is, the retraction space of the second F lens group increases, resulting in an increase in the thickness of the camera body other than the lens barrel.

The parameter $T2f/(T1\ f\ T2r)$ that is lower than the lower limit of the relationship (18) means that the second F lens group becomes thinner and thus the shortening effect of the thickness of the lens barrel by the retraction of the second F lens from the optical axis is diminished. Accordingly, the merit of a typical retraction mechanism of the lens barrel is reduced.

When a meniscus lens with its convex surface directed toward the image side is used for the first negative lens in the second F lens, the angle of incidence and the angle of emergence of oblique rays at the surface on the object side and the surface on the image side of the first negative lens in the second F lens group can be reduced. Therefore, the function of correcting longitudinal chromatic aberration by the pair of the first positive lens and the first negative lens in the second F lens group can be furthermore improved.

In addition, by mainly correcting the chromatic aberration of magnification by the pair of the second negative lens and the second positive lens, the roles of correcting the longitudinal chromatic aberration and the chromatic aberration of magnification are shared by the two pairs. Therefore, the designing flexibility of the aberration correction is improved.

The ease of manufacturing lens is improved by cementing the first positive lens and the first negative lens in the second F lens group.

Each aberration is greatly traded off in each lens surface in the second F lens group to reduce the aberration amount in the end. As a result, the sensitivity on manufacturing error tends to be high.

Substantial manufacturing error can be reduced by cementing the first positive lens and the first negative lens, and the second negative lens and the second positive lens, which contributes to stable performance. In addition, this leads to reduction of the number of parts that holds a lens barrel.

A focusing system in which entirely or partially moving the second lens group to conduct focusing from the infinity to the close range is advantageous over a system of moving the entire image forming lens in terms of the weight of the moving portion, which leads to a high speed performance of focusing and energy saving. When the image forming lens is incorporated into a camera or a handheld terminal, the mechanism for storing the second lens group is conveniently used in common with the focusing mechanism.

When the relationship (16) is satisfied, the height variation of the marginal beams of light on the optical axis that passes through the surface of the lens situated closest to an object among the second lens group is kept small even when the air space between the first lens group and the second lens group changes because the focal length of the first lens group is relatively long, thereby preventing deterioration of performance due to the error of the air space.

As described above, in the image forming lens of the present invention, the second F lens group plays a main role of the image function and in addition, the trade-off among the aberrations in the second F lens group plays a large part of the aberration correction of the entire system.

Therefore, if the relative assembly accuracy of each lens in the second F lens group is kept relatively high, the aberration correction for the entire system is not greatly affected even when the assembly accuracy of the entire second F lens group over the other lens group is relatively low.

Therefore, not the first lens group or the second R lens group that is relatively difficult to keep a high positional accuracy with the other lens groups but the second F lens group is configured to be retractable from the optical axis. Thus, the thickness of the lens barrel when not in use can be greatly reduced while retracting the second F lens group from the optical axis without interfering the other lens groups that are retracted.

Five embodiments of the image forming lens are illustrated in FIGS. 1 to 5.

These examples specifically relates to Examples 1 to 5 described later. The same reference numerals are used in common in FIG. 1 to FIG. 5.

The image forming lens illustrated in FIGS. 1 to 5 are structured to have a first lens group I arranged on the object side (left-hand side in FIGS. 1 to 5) relative to an aperture stop S and a second lens group II arranged on the image side (right-hand side in FIGS. 1 to 5) relative to an aperture stop.

The first lens group I includes a first F lens group 1F and a first R lens group 1R having a positive power from the object side. The first F lens 1F and the first R lens 1R are arranged with the widest air space in the first lens group I in this sequence from the object side. The first F lens group 1F includes a first negative lens L1 and a second negative lens L2, both of which have a concavity meniscus form with the convex surface directed toward the object side.

The curvature of the concavity surface on the image side of these first negative lens L1 and the second negative lens L2 is larger than the other side.

The first R lens group 1R is constituted by one positive lens (biconvex lens) L3.

The second lens group II arranged on the image side relative to the aperture stop S is structured to have a second F lens group 2F on the object side and a second R lens group 2R on the image side. The second F lens group 2F has four lenses of a positive lens L4, a negative lens L5, a negative lens L6 and a positive lens L7 arranged in this sequence from the object side to the image side. The second R lens group 2R is structured to have one lens L8.

Among the four lenses constituting the second F lens group 2F, the two lenses of the positive lens L4 and the negative lens L5 on the object size are cemented and the two of the positive lens L6 and the negative lens L7 on the object side are also cemented.

The image forming lenses illustrated in FIGS. 1 to 5 satisfy the relationships (1) to (5) as described in Examples 1 to 5.

In FIGS. 1 to 5, a parallel plain plate F arranged on the image side of the second R lens group 2R is illustrated as one transparent parallel plain plate assuming various kinds of filters such as an optical low-pass filter and an infra-red cut filter, and a cover glass (seal glass) of an image pick-up element such as a CCD (charge coupled device) sensor.

EXAMPLE

Five examples of the image forming lens of the present invention are specified below.

The maximum image height in Examples 1 to 5 is 4.80 mm.

As described above, the parallel plain plate arranged on the image side of the second R lens group is assumed to be filters such as an optical low-pass filter and an infra-red cut filter, and a cover glass (seal glass) of a light reception element such as a CCD (charge coupled device) sensor and illustrated as one parallel plain plate optically corresponding thereto in each Example.

The reference symbols in Examples represent the following:
f: Focal length of the entire system
F: F number
ω: Half image angle Y': Maximum image height
R: Curvature radius
D: Space between surfaces
Nd: Refraction index
vd: Abbe number
K: Conic constant of aspheric surface
$A_4$: Fourth order aspheric coefficient
$A_6$: Sixth order aspheric coefficient
$A_8$: Eighth order aspheric coefficient
$A_{10}$: Tenth order aspheric coefficient The aspheric surface is represented by the following relationship with respective aspheric coefficients.

$$X = CH^2/[1+\sqrt{(1-(1+K)C^2H^2)}] + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

where C denotes an inverse of a paraxial curvature radius (paraxial curvature), H denotes a height from an optical axis of the image forming lens system, and k represents a conic multiplier number.

The unit of the dimension of the length in each Example described below is mm.

Example 1 f=6.02 F1.81 ω=39.0
Data of Example 1 are shown in Table 1.

TABLE 1

|   | R | D | N | v | H | glass |
|---|---|---|---|---|---|---|
| 1 | 25.698 | 1.20 | 1.49700 | 81.54 | 8.3 | S-FPL51 (OHARA) |
| 2 | 8.100 | 2.22 |  |  | 6.4 |  |
| 3 | 17.500 | 1.20 | 1.51633 | 64.06 | 6.3 | L-BSL7 (OHARA) |
| 4* | 5.063 | 9.60 |  |  | 5.2 |  |
| 5 | 18.344 | 1.71 | 1.83481 | 42.71 | 4.4 | S-LAH55 (OHARA) |
| 6 | −85.084 | 6.68 |  |  | 4.2 |  |
| 7 | Aperture Stop | 3.50 |  |  | 3.83 |  |
| 8 | ∞ | 2.27 | 1.49700 | 81.54 | 3.8 | S-FPL51 (OHARA) |
| 9 | −7.572 | 1.00 | 1.72151 | 29.23 | 3.8 | S-TIH18 (OHARA) |
| 10 | −20.507 | 0.20 |  |  | 4.0 |  |
| 11 | 12.858 | 1.00 | 1.65412 | 39.68 | 4.5 | S-NBH5 (OHARA) |
| 12 | 8.287 | 3.03 | 1.49700 | 81.54 | 4.5 | S-FPL51 (OHARA) |
| 13 | −26.318 | 3.75 |  |  | 4.6 |  |
| 14* | 17.173 | 1.50 | 1.51633 | 64.06 | 4.9 | L-BSL7 (OHARA) |
| 15 | 107.573 | 6.38 |  |  | 4.9 |  |
| 16 | ∞ | 1.50 | 1.50000 | 64.00 | 4.8 | Filter, etc. |
| 17 | ∞ | 0.60 |  |  | 4.8 |  |

Aspheric Surface (Surface)

An asterisk is attached to the data for the aspheric surface. The same is true to Examples 1 to 5.

The data for the aspheric surfaces are shown below.
Fourth Surface
K=−0.45, A4=−3.25734E-04, A6=−9.32912E-06, A8=7.29745E-08, A10=−6.48034E-09
Fourteenth Surface
A4=−2.92559E-04, A6=2.21131E-06, A8=−1.61322E-07, A10=2.26618E-09

In the representation, for example, 2.26618E-09 means $2.26618 \times 10^{-9}$

The same is true to Examples 1 to 5.
Parameter Values of Relationship

The parameter values of each relationship are shown in Table 2.

TABLE 2

| $D_1/D_2$ | 0.392 |
|---|---|
| $v_d$ | 64.06 |
| $f_{2F}/f_{2R}$ | 0.452 |
| $D_{2F2R}/Y'$ | 2.656 |
| $D_3/D_4$ | 0.229 |

Example 2 f=6.00 F1.80 ω=39.1
Data of Example 2 are shown in Table 3.

TABLE 3

|   | R | D | N | v | H | glass |
|---|---|---|---|---|---|---|
| 1 | 61.051 | 1.20 | 1.49700 | 81.54 | 8.0 | S-FPL51 (OHARA) |
| 2 | 9.754 | 1.33 |  |  | 6.4 |  |
| 3 | 16.300 | 1.20 | 1.51633 | 64.06 | 6.3 | L-BSL7 (OHARA) |
| 4* | 4.933 | 9.50 |  |  | 5.2 |  |
| 5 | 18.712 | 1.77 | 1.81600 | 46.62 | 4.4 | S-LAH59 (OHARA) |
| 6 | −49.780 | 6.07 |  |  | 4.2 |  |
| 7 | Aperture Stop | 4.08 |  |  | 3.7 |  |
| 8 | −42.553 | 2.22 | 1.49700 | 81.54 | 3.6 | S-FPL51 (OHARA) |
| 9 | −6.630 | 1.00 | 1.69895 | 30.13 | 3.7 | S-TIM35 (OHARA) |
| 10 | −16.691 | 0.20 |  |  | 3.9 |  |
| 11 | 12.097 | 1.00 | 1.72825 | 28.46 | 4.4 | S-TIH10 (OHARA) |
| 12 | 9.318 | 3.08 | 1.49700 | 81.54 | 4.4 | S-FPL51 (OHARA) |
| 13 | −26.148 | 3.87 |  |  | 4.6 |  |
| 14* | 16.494 | 1.50 | 1.51633 | 64.06 | 4.8 | L-BSL7 (OHARA) |
| 15 | 132.160 | 5.71 |  |  | 4.8 |  |
| 16 | ∞ | 1.50 | 1.50000 | 64.00 | 4.8 | Filter, etc. |
| 17 | ∞ | 0.60 |  |  | 4.8 |  |

Aspheric Surface
The data for the aspheric surfaces are shown below.
Fourth Surface
K=−0.40, A4=−4.07064E-04, A6=−9.23532E-06, A8=−7.96701E-08, A10=−3.61167E-09, A12=−3.61500E-11, A14=2.19580E-14, A16=8.93836E-15, A18=−1.95337E-15
Fourteenth Surface
A4=−3.58070E-04, A6=5.60374E-07, A8=−1.61334E-07, A10=1.41953E-09
Parameter Values of Relationship The parameter values of each relationship are shown in Table 4.

TABLE 4

| $D_1/D_2$ | 0.377 |
|---|---|
| $v_d$ | 64.06 |
| $f_{2F}/f_{2R}$ | 0.488 |
| $D_{2F2R}/Y'$ | 2.681 |
| $D_3/D_4$ | 0.212 |

Example 3 f=6.00 F1.9 ω=39.1
Data of Example 3 are shown in Table 5.

TABLE 5

|   | R | D | N | v | H | glass |
|---|---|---|---|---|---|---|
| 1 | 29.270 | 1.20 | 1.49700 | 81.54 | 8.5 | S-FPL51 (OHARA) |
| 2 | 8.686 | 1.93 |  |  | 6.6 |  |
| 3 | 16.300 | 1.30 | 1.51633 | 64.06 | 6.5 | L-BSL7 (OHARA) |
| 4* | 4.996 | 10.82 |  |  | 5.3 |  |
| 5 | 18.093 | 1.74 | 1.81600 | 46.62 | 4.4 | S-LAH59 (OHARA) |
| 6 | −65.958 | 6.33 |  |  | 4.2 |  |

TABLE 5-continued

| | R | D | N | ν | H | glass |
|---|---|---|---|---|---|---|
| 7 | Aperture Stop | 3.50 | | | 3.62 | |
| 8 | −117.284 | 2.16 | 1.49700 | 81.54 | 3.7 | S-FPL51 (OHARA) |
| 9 | −7.276 | 1.08 | 1.69895 | 30.13 | 3.8 | S-TIM35 (OHARA) |
| 10 | −20.437 | 0.20 | | | 3.95 | |
| 11 | 12.380 | 1.00 | 1.72825 | 28.46 | 4.4 | S-TIH10 (OHARA) |
| 12 | 9.073 | 2.73 | 1.49700 | 81.54 | 4.4 | S-FPL51 (OHARA) |
| 13 | −34.716 | 3.41 | | | 4.5 | |
| 14* | 17.213 | 1.50 | 1.51633 | 64.06 | 4.8 | L-BSL7 (OHARA) |
| 15 | 198.652 | 6.29 | | | 4.8 | |
| 16 | ∞ | 1.50 | 1.50000 | 64.00 | 4.8 | Filter, etc. |
| 17 | ∞ | 0.60 | | | 4.8 | |

Aspheric Surface

The data for the aspheric surfaces are shown below.
Fourth Surface
K=−0.40, A4=−3.72757E-04, A6=−5.62333E-06, A8=−2.23363E-07, A10=−7.20448E-10, A12=A12=−3.61500E-11, A14=2.19580E-14, A16=8.93836E-15, A18=−1.95337E-15
Fourteenth Surface
A4=−3.07134E-04, A6=2.41618E-06, A8=−1.97489E-07, A10=2.81138E-09
Parameter Values of Relationship
The parameter values of each relationship are shown in Table 6.

TABLE 6

| | |
|---|---|
| $D_1/D_2$ | 0.389 |
| $v_d$ | 64.06 |
| $f_{2F}/f_{2R}$ | 0.536 |
| $D_{2F2R}/Y'$ | 2.517 |
| $D_3/D_4$ | 0.204 |

Example 4 f=6.00 F1.89 ω=39.1
Data of Example 4 are shown in Table 7.

TABLE 7

| | R | D | N | ν | H | glass |
|---|---|---|---|---|---|---|
| 1 | 29.553 | 1.20 | 1.49700 | 81.54 | 8.1 | S-FPL51 (OHARA) |
| 2 | 7.700 | 2.03 | | | 6.2 | |
| 3 | 14.657 | 1.20 | 1.51633 | 64.06 | 6.1 | L-BSL7 (OHARA) |
| 4* | 4.969 | 9.79 | | | 5.2 | |
| 5 | 18.605 | 1.78 | 1.80400 | 46.57 | 4.4 | S-LAH65 (OHARA) |
| 6 | −45.719 | 6.16 | | | 4.2 | |
| 7 | Aperture Stop | 3.50 | | | 3.6 | |
| 8 | 300.000 | 2.22 | 1.49700 | 81.54 | 3.7 | S-FPL51 (OHARA) |
| 9 | −7.249 | 1.17 | 1.69895 | 30.13 | 3.8 | S-TIM35 (OHARA) |
| 10 | −26.903 | 0.20 | | | 3.9 | |
| 11 | 14.941 | 1.00 | 1.65412 | 39.68 | 4.3 | S-NBH5 (OHARA) |
| 12 | 9.545 | 2.92 | 1.49700 | 81.54 | 4.4 | S-FPL51 (OHARA) |
| 13 | −20.274 | 2.80 | | | 4.6 | |
| 14* | 19.014 | 1.50 | 1.51633 | 64.06 | 4.8 | L-BSL7 (OHARA) |
| 15 | −2135.582 | 6.82 | | | 4.8 | |
| 16 | ∞ | 1.50 | 1.50000 | 64.00 | 4.8 | Filter, etc. |
| 17 | ∞ | 0.60 | | | 4.8 | |

Aspheric Surface

The data for the aspheric surfaces are shown below.
Fourth Surface
K=−0.40000, A4=−4.08087E-04, A6=−9.12948E-06, A8=−1.55692E-07, A10=−3.07007E-09, A12=−3.61500E-11, A14=2.19580E-14, A16=8.93836E-15, A18=−1.95337E-15
Fourteenth Surface
A4=−2.75989E-04, A6=1.94315E-06, A8=−1.43531E-07, A10=1.93052E-09
Parameter Values of Relationship
The parameter values of each relationship are shown in Table 8.

TABLE 8

| | |
|---|---|
| $D_1/D_2$ | 0.393 |
| $v_d$ | 64.06 |
| $f_{2F}/f_{2R}$ | 0.534 |
| $D_{2F2R}/Y'$ | 2.460 |
| $D_3/D_4$ | 0.217 |

Example 5 f=6.00 F1.81 ω=39.0
Data of Example 5 are shown in Table 9.

TABLE 9

| | R | D | N | ν | H | glass |
|---|---|---|---|---|---|---|
| 1 | 19.183 | 1.20 | 1.49700 | 81.54 | 8.4 | S-FPL51 (OHARA) |
| 2 | 7.211 | 2.73 | | | 6.3 | |
| 3 | 17.166 | 1.20 | 1.51633 | 64.06 | 6.3 | L-BSL7 (OHARA) |
| 4* | 5.100 | 8.88 | | | 5.3 | |
| 5 | 19.824 | 1.78 | 1.80400 | 46.57 | 4.6 | S-LAH65 (OHARA) |
| 6 | −40.598 | 6.37 | | | 4.4 | |
| 7 | Aperture Stop | 3.62 | | | 3.6 | |
| 8 | −42.485 | 2.10 | 1.49700 | 81.54 | 3.7 | S-FPL51 (OHARA) |
| 9 | −6.923 | 1.00 | 1.69895 | 30.13 | 3.8 | S-TIM35 (OHARA) |
| 10 | −20.101 | 0.20 | | | 4.0 | |
| 11 | 15.665 | 1.00 | 1.65412 | 39.68 | 4.5 | S-NBH5 (OHARA) |
| 12 | 9.801 | 3.20 | 1.49700 | 81.54 | 4.6 | S-FPL51 (OHARA) |
| 13 | −16.209 | 0.50 | | | 4.8 | |
| 14* | 34.338 | 1.50 | 1.49700 | 81.54 | 4.9 | S-FPL51 (OHARA) |
| 15 | −39.847 | 9.02 | | | 4.9 | |
| 16 | ∞ | 1.50 | 1.50000 | 64.00 | 4.8 | Filter, etc. |
| 17 | ∞ | 0.60 | | | 4.8 | |

Aspheric Surface

The data for the aspheric surfaces are shown below.
Fourth Surface
K=−0.40, A4=−4.12565E-04, A6=−5.03316E-06, A8−3.48931E-07, A10=1.11294E-09, A12=−3.61500E-11, A14=2.19580E-14, A16=8.93836E-15, A18=−1.95337E-15
Fourteenth Surface
A4=−2.37812E-04, A6=2.58524E-06, A8=−1.51407E-07, A10=2.43679E-09
Parameter Values of Relationship
The parameter values of each relationship are shown in Table 10.

TABLE 10

| | |
|---|---|
| $D_1/D_2$ | 0.402 |
| $v_d$ | 81.54 |
| $f_{2F}/f_{2R}$ | 0.534 |
| $D_{2F2R}/Y'$ | 1.979 |
| $D_3/D_4$ | 0.232 |

FIGS. 6 to 10 illustrate aberration graphs relating to Examples 1 to 5.

In these aberration diagrams, the broken line of the spherical aberration represents the sine condition, and the solid line and the broken line in the astigmatism represent a sagittal image plane and a meridional image plane, respectively. "d" and "g" represent aberration curve diagram for d line, and g line, respectively.

As illustrated in the aberration diagrams, the aberration is corrected to a high degree in each Example, and the spheric aberration and longitudinal chromatic aberration are small enough to cause no practical problems. As seen in the aberration diagrams illustrated in FIGS. 6 to 10, astigmatism, curvature of field and chromatic aberration of magnification are suitably corrected.

That is, as seen in FIGS. 6 to 10, coma aberration and disturbance of color difference thereof are sufficiently corrected or controlled to the most peripheral portion. Accordingly, distortion aberration is suppressed to 2.0% or less. Therefore, the lens is secured to have an excellent image performance while it has a wide angle such as a half angle of about 38 degree and a large diameter such as an F number of about 2.0.

Therefore, the lens is secured to have an excellent image performance while it has a wide angle such as a half angle of about 38 degree and a large diameter such as an F number of about 2.0.

Another six embodiments of the image forming lens are illustrated in FIGS. 11 to 16.

Each portion in common in each figure is represented by the same reference numeral.

Figure 11:
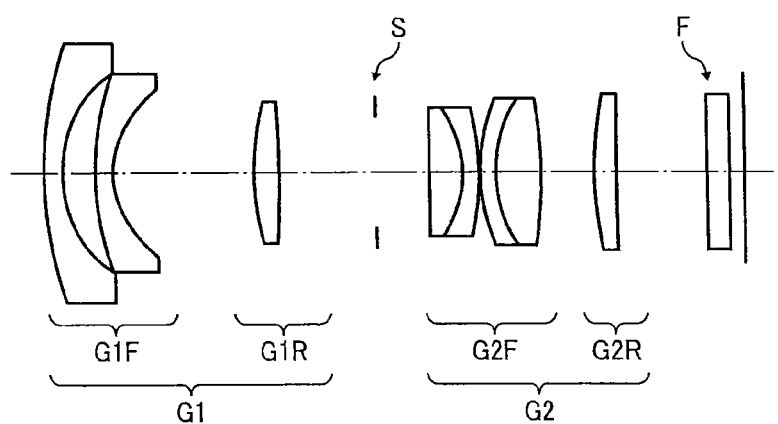
FIG. 11 is a diagram illustrating the image forming lens of Example 6 described later.

FIG. 11 relates to Example 6 described later and FIGS. 12 to 16 relate to Examples 7 to 11 described later, respectively.

The image forming lens illustrated in FIGS. 11 to 16 has a first lens group G1 provided on the object side (left-hand side) and a second lens group G2 on the image side (right-hand side) relative to the aperture stop S.

The first lens group G1 includes a first F lens group G1F having a negative refraction power on the object side, and a first R lens group G1R having a positive refraction power on the aperture stop side with the widest gap in the first lens group G1.

The first F lens group G1F has two negative lenses and the first R lens group G1R has one positive lens.

The second lens group G2 is arranged and includes a second F lens group G2F and a second R lens group G2R in this sequence from the aperture stop side.

The second F lens group G2F has a positive refraction power and has an arrangement of a first positive lens, a first negative lens, a second negative lens, and a second positive lens in this sequence from the side of the aperture stop S. The second R lens group G2R has one positive lens or one negative lens.

Figure 12:
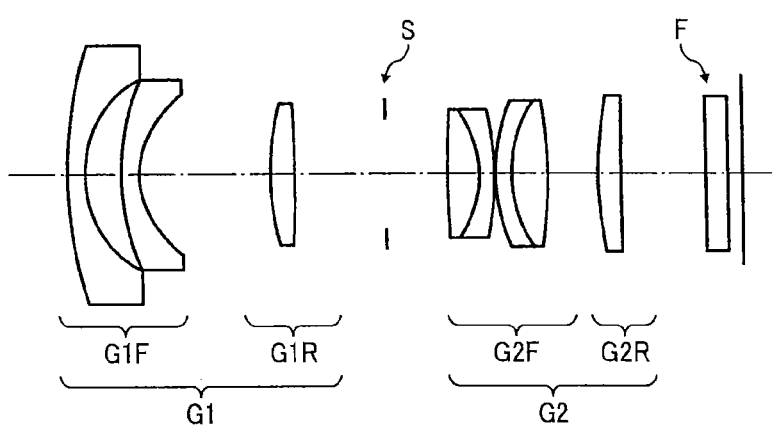
FIG. 12 is a diagram illustrating the image forming lens of Example 7 described later.
Figure 13:
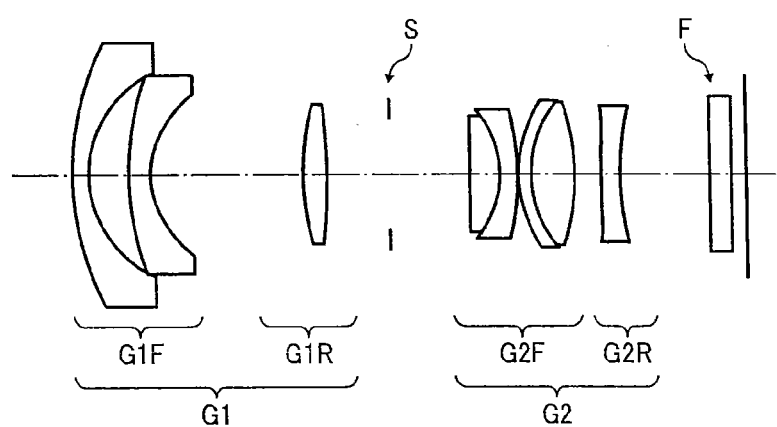
FIG. 13 is a diagram illustrating the image forming lens of Example 8 described later.
Figure 14:
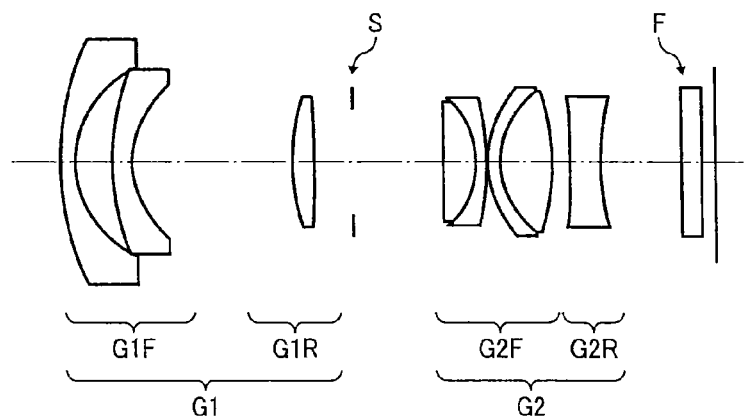
FIG. 14 is a diagram illustrating the image forming lens of Example 9 described later.
Figure 15:
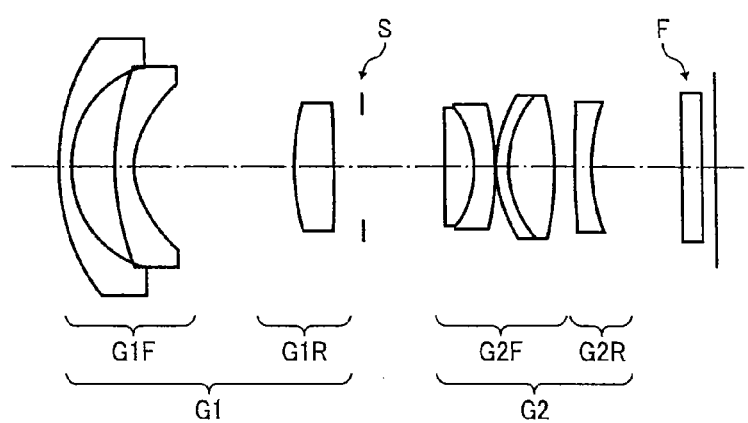
FIG. 15 is a diagram illustrating the image forming lens of Example 10 described later.
Figure 16:
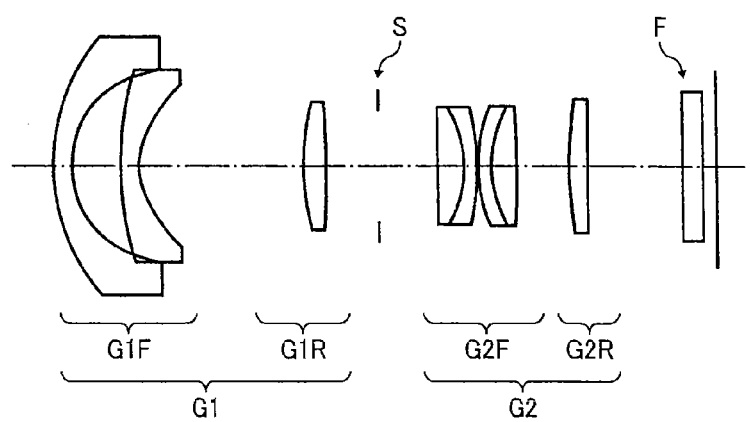
FIG. 16 is a diagram illustrating the image forming lens of Example 11 described later.
Figure 19:
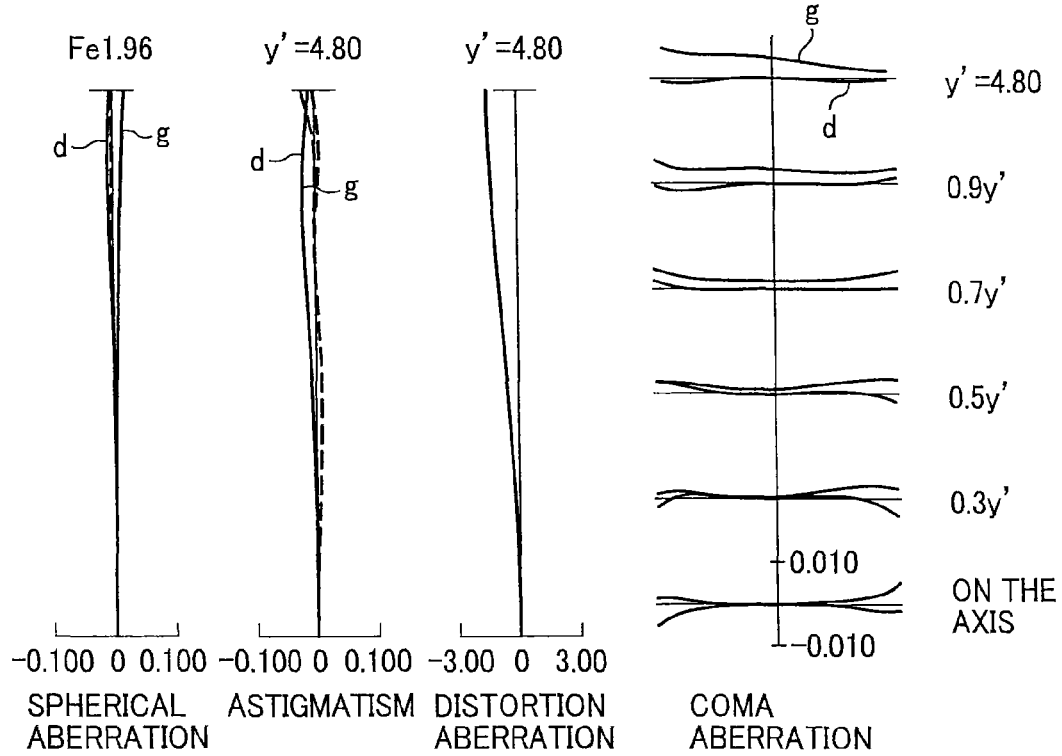
FIG. 19 is a diagram illustrating aberration of an indefinite object of the image forming lens of Example 8.
Figure 20:
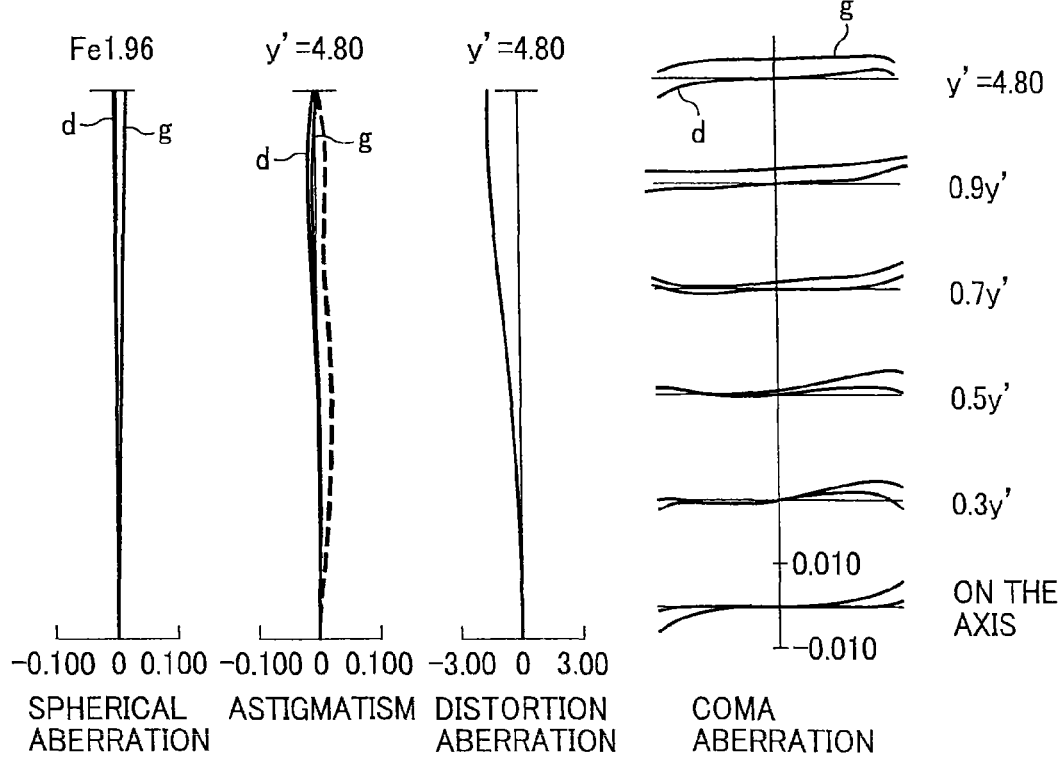
FIG. 20 is a diagram illustrating aberration of an indefinite object of the image forming lens of Example 9.
Figure 21:
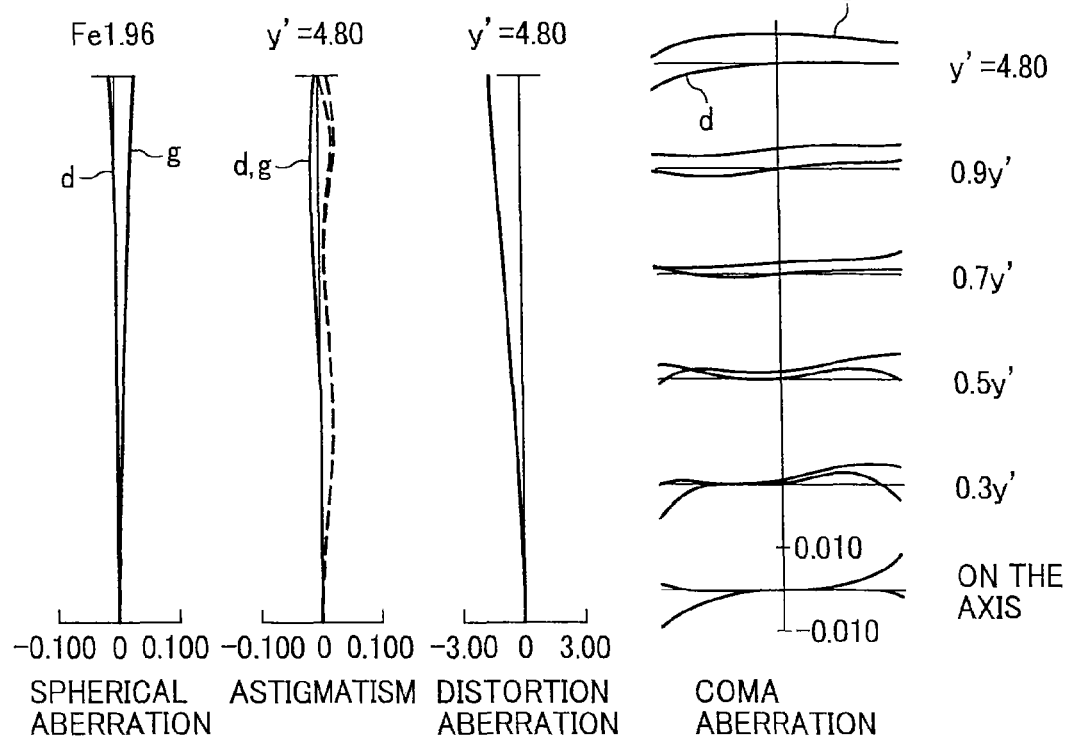
FIG. 21 is a diagram illustrating aberration of an indefinite object of the image forming lens of Example 10.
Figure 22:
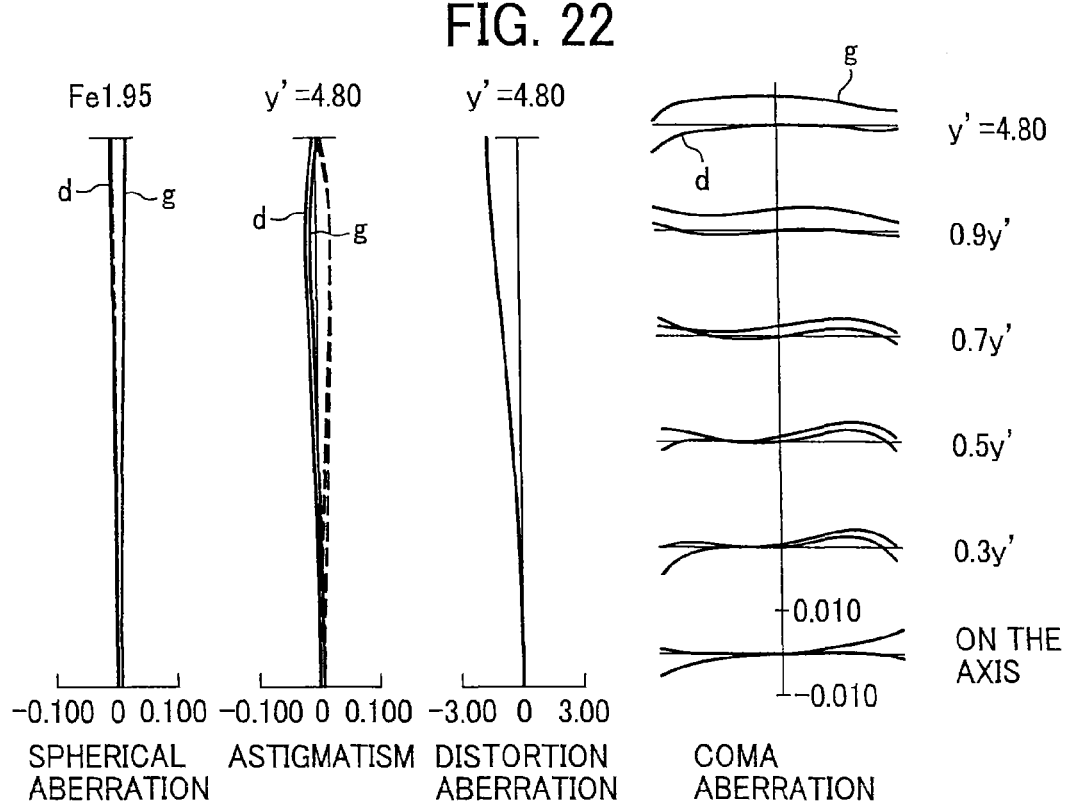
FIG. 22 is a diagram illustrating aberration of an indefinite object of the image forming lens of Example 11.
Figure 23:
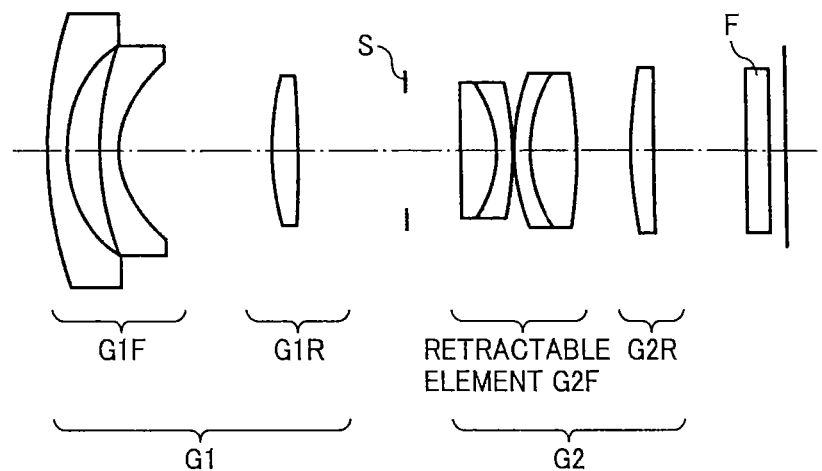
FIG. 23 is a diagram illustrating a photographic optical system (image forming lens) of Example 12.
Figure 24:
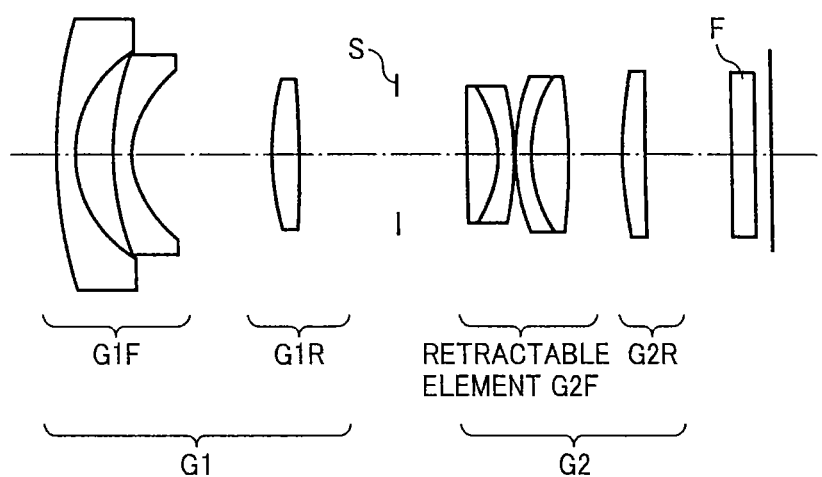
FIG. 24 is a diagram illustrating a photographic optical system (image forming lens) of Example 13.
Figure 25:
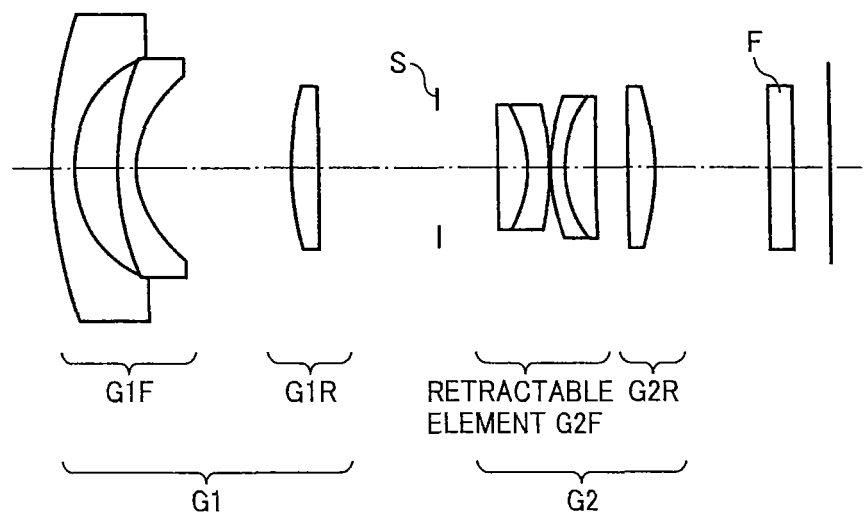
FIG. 25 is a diagram illustrating a photographic optical system (image forming lens) of Example 14.
Figure 26:
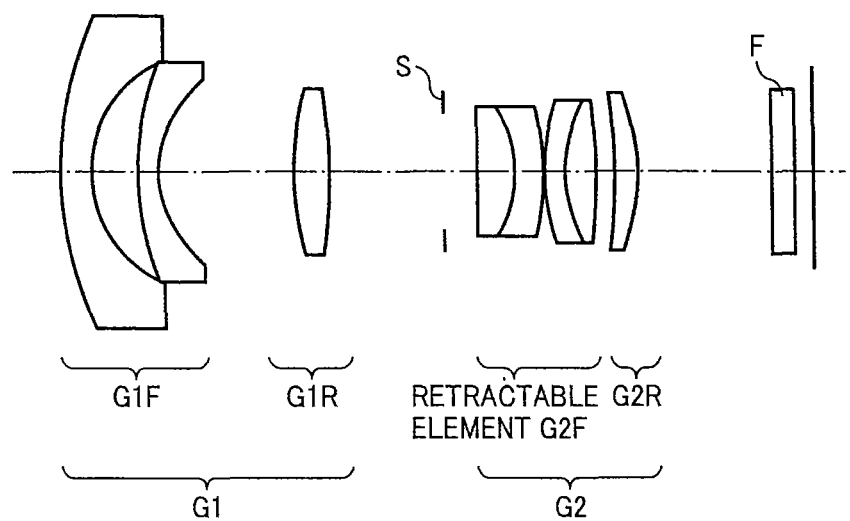
FIG. 26 is a diagram illustrating a photographic optical system (image forming lens) of Example 15.
Figure 27:
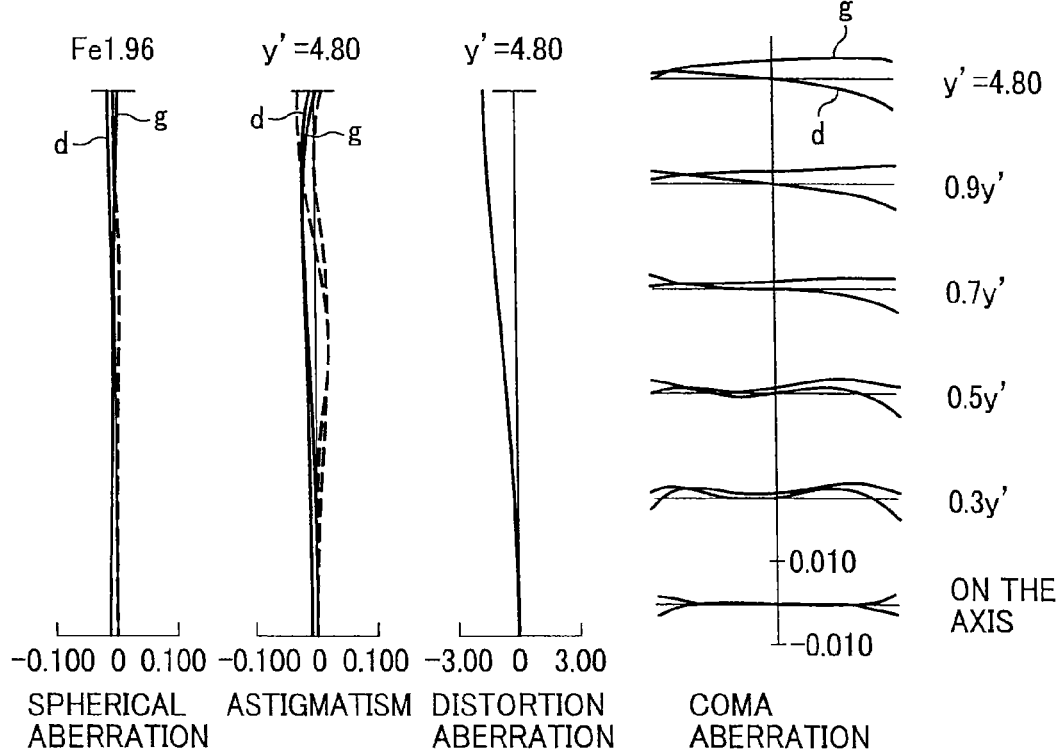
FIG. 27 is a diagram illustrating aberration curve of an indefinite object of the photographic optical system (image forming lens) of Example 12.
Figure 28:
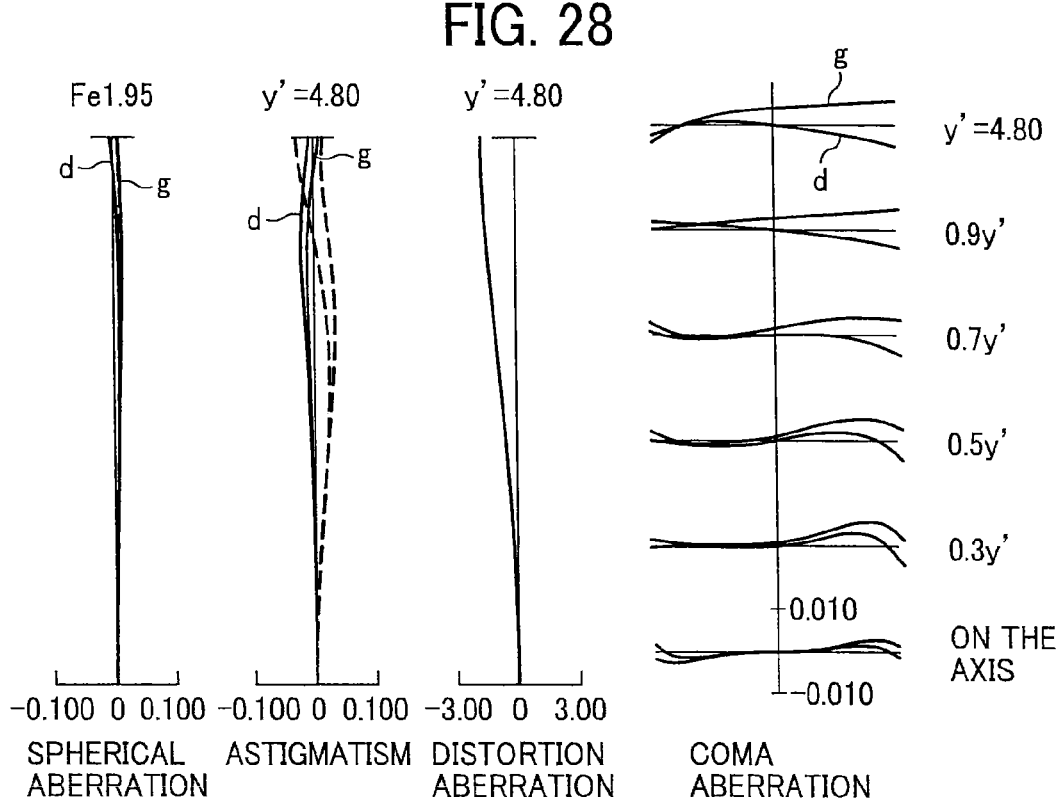
FIG. 28 is a diagram illustrating aberration curve of an indefinite object of the photographic optical system (image forming lens) of Example 13.
Figure 29:
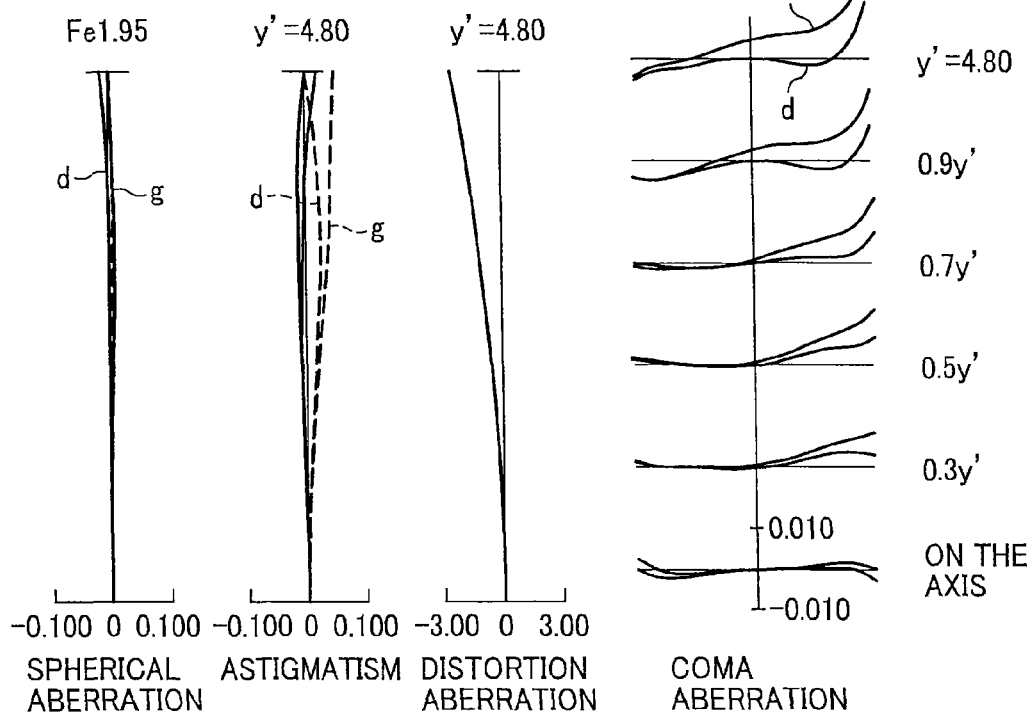
FIG. 29 is a diagram illustrating aberration curve of an indefinite object of the photographic optical system (image forming lens) of Example 14.
Figure 30:
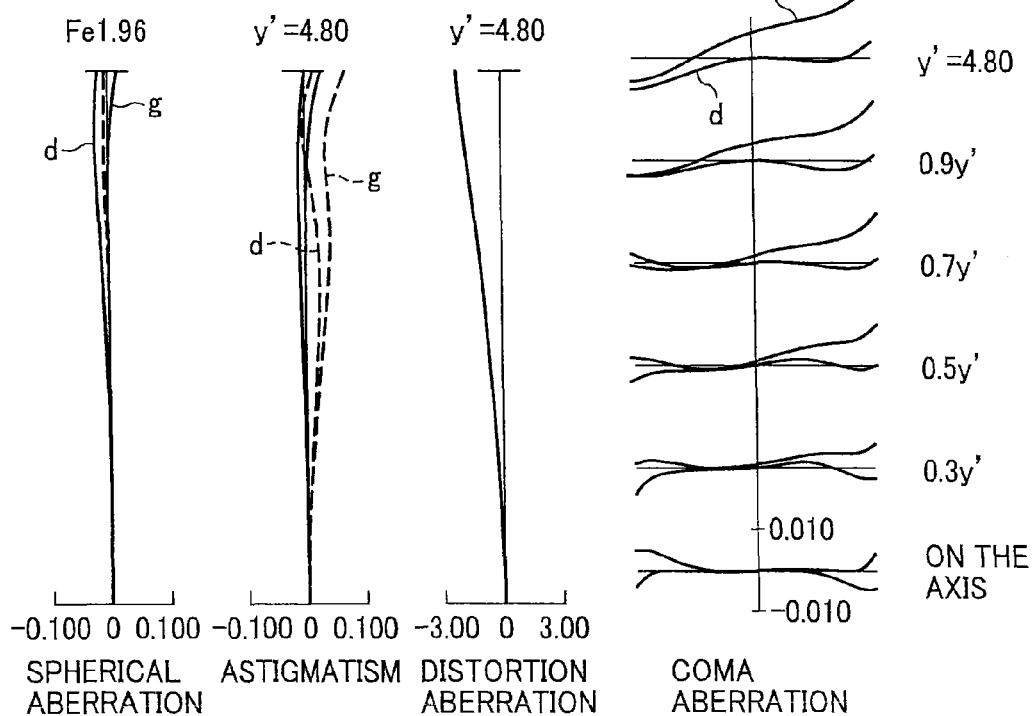
FIG. 30 is a diagram illustrating aberration curve of an indefinite object of the photographic optical system (image forming lens) of Example 15.

That is, the one lens constituting the second R lens group G2R is a positive lens in the embodiments (examples) illustrated in FIGS. 11, 12 and 16, and, a negative lens, in FIGS. 13, 14 and 15

The symbols F in FIGS. 11 to 16 represent a transparent parallel plain plate corresponding to a synthesis system including various kinds of filters and a cover glass for a light reception element.

Another six examples of the image forming lens of the present invention are specified below.

The reference numerals in Examples represent the following:
f: Focal length of the entire system
F: F number
ω: Half image angle
Y': Maximum image height
R: Curvature radius
D: Space between surfaces
Nd: Refraction index
vd: Abbe number
K: Conic constant of aspheric surface
$A_4$: Fourth order aspheric coefficient
$A_6$: Sixth order aspheric coefficient
$A_8$: Eighth order aspheric coefficient
$A_{10}$: Tenth order aspheric coefficient Aspheric surface is represented by the following relationship with respective aspheric coefficients.

where X denotes a depth along the optical direction, C denotes an inverse of a paraxial curvature radius (paraxial curvature), H denotes a height from an optical axis of the image forming lens system, and k represents a conic multiplier number.

$$X=CH^2/[1+\sqrt{(1-(1+K)C^2H^2)}]+A_4\cdot H^4+A_6\cdot H^6+A_8\cdot H^8+A_{10}\cdot H^{10}$$

The unit of the dimension of the length in each Example described below is mm.

The glass species are the product names available from Ohara Inc.

Example 6 f=6.00 F1.96

Data of Example 6 are shown in Table 11.

TABLE 11

| Surface number | R | D | N | v | Glass species (material) | Memo | |
|---|---|---|---|---|---|---|---|
| 1 | 25.026 | 1.2 | 1.497 | 81.54 | S-FPL51 | First lens | First F lens group |
| 2 | ∞ | 2.27 | | | | | |
| 3 | 17.5 | 1.2 | 1.51633 | 64.06 | L-BSL7 | Second lens | |
| 4 | 5.073 | 9.62 | | | | | |
| 5 | 18.209 | 1.71 | 1.83481 | 42.71 | S-LAH55 | Third lens | First R lens group |
| 6 | −88.519 | 6.7 | | | | | |
| 7 | ∞ | 3.5 | — | — | | Aperture Stop | |
| 8 | ∞ | 2.27 | 1.497 | 81.54 | S-FPL51 | Fourth lens | Second F lens group |
| 9 | −7.559 | 1 | 1.72151 | 29.23 | S-TIH18 | Fifth lens | |
| 10 | −20.637 | 0.2 | | | | | |
| 11 | 12.826 | 1 | 1.65412 | 39.68 | S-NBH5 | Sixth lens | |
| 12 | 8.341 | 3.03 | 1.497 | 81.54 | S-FPL51 | Seventh lens | |
| 13 | −26.301 | 3.65 | | | | | |
| 14 | 18.125 | 1.5 | 1.51633 | 64.06 | L-BSL7 | Eighth lens | Second R lens group |
| 15 | 160.356 | 6.07 | | | | | |
| 16 | ∞ | 1.5 | 1.54892 | 69.31 | | Filter | |
| 17 | ∞ | | | | | | |

Non-Aspheric Surface

The data for the non-aspheric surfaces are shown in Table 12.

TABLE 12

| | K | A2 | A4 | A6 | A8 | A10 |
|---|---|---|---|---|---|---|
| 4 | −0.4 | 0 | −3.8568E−04 | −8.2523E−06 | −1.1521E−07 | −2.5946E−09 |

| | A12 | A14 | A16 | A18 |
|---|---|---|---|---|
| | −2.7651E−11 | −1.2444E−13 | 2.3642E−15 | −1.1047E−15 |

| | K | A2 | A4 | A6 | A8 | A10 |
|---|---|---|---|---|---|---|
| 14 | 0 | 0 | −2.9359E−04 | 2.2462E−06 | −1.6205E−07 | 2.3075E−09 |

Calculation of Relationships for Example 1

The parameter values of each relationship are shown in Table 13.

TABLE 13

| | Relationship | | | Calculation result |
|---|---|---|---|---|
| (6) | $30 < \nu dn < 41$ | $\nu dn$ 39.68 | Sixth lens | 39.68 |
| (7) | $\Delta\theta gFn < 0$ | $\theta gFn$ 0.5737 | Sixth lens | −0.0036 |
| (8) | $70 < \nu dp$ | $\nu dp$ 81.54 81.54 | Fourth lens Seventh lens | 81.54 81.54 |
| (9) | $0 < \Delta\theta gFp$ | $\Delta\theta gFp$ 0.5375 0.5375 | Fourth lens Seventh lens | 0.0280 0.0280 |
| (10) | $0.2 < f/f2 < 0.5$ | f 6.00 | f2 17.78 | 0.34 |
| (11) | $70 < \nu dn1$ | $\nu dn1$ 81.54 | | 81.54 |
| (12) | $0 < \Delta\theta gFn1$ | $\Delta\theta gFn1$ 0.5375 | | 0.0280 |
| (13) | $|f1|/f > 8$ | f 6.00 | f1 251.01 | 41.81 |

Example 7 f=6.00 F1.95

Data of Example 7 are shown in Table 14.

TABLE 14

| Surface number | R | D | N | ν | Glass species (material) | Memo | |
|---|---|---|---|---|---|---|---|
| 1 | 25.96 | 1.2 | 1.48749 | 70.24 | S-FSL5 | First lens | First F lens |
| 2 | 7.2 | 2.51 | | | | | |
| 3 | 15 | 1.2 | 1.51633 | 64.06 | L-BSL7 | Second lens | group |
| 4 | 4.926 | 8.83 | | | | | |
| 5 | 18.357 | 1.76 | 1.804 | 46.57 | S-LAH65 | Third lens | First R lens group |
| 6 | −46.654 | 6.22 | | | | | |
| 7 | ∞ | 4.26 | — | — | | Aperture Stop | |
| 8 | 115.069 | 1.99 | 1.497 | 81.54 | S-FPL51 | Fourth lens | Second F lens group |
| 9 | −8.3 | 1 | 1.74077 | 27.79 | S-TIH13 | Fifth lens | |
| 10 | −21.635 | 0.2 | | | | | |
| 11 | 12.473 | 1 | 1.72047 | 34.71 | S-NBH8 | Sixth lens | |
| 12 | 8.433 | 2.51 | 1.497 | 81.54 | S-FPL51 | Seventh lens | |
| 13 | −33.186 | 3.4 | | | | | |
| 14 | 16.892 | 1.5 | 1.51633 | 64.06 | L-BSL7 | Eighth lens | Second R lens group |
| 15 | 108.71 | 5.73 | | | | | |
| 16 | ∞ | 1.5 | 1.54892 | 69.31 | | Filter | |
| 17 | ∞ | | | | | | |

Non-Aspheric Surface

The data for the non-aspheric surfaces are shown in Table 15.

TABLE 15

| | K | A2 | A4 | A6 | A8 | A10 |
|---|---|---|---|---|---|---|
| 4 | −0.89455 | 0 | −6.6197E−05 | −2.2678E−06 | −9.2764E−08 | −1.0794E−09 |

| | K | A2 | A4 | A6 | A8 | A10 |
|---|---|---|---|---|---|---|
| 14 | 0 | 0 | −3.1109E−04 | 2.2882E−06 | −1.4584E−07 | 1.8406E−09 |

Calculation of Relationships for Example 7

The parameter values of each relationship are shown in Table 16.

TABLE 16

| | Relationship | | | Calculation result |
|---|---|---|---|---|
| | | $\dfrac{Ndn}{\theta gFn}$ | | |
| (6) | $30 < vdn < 41$ | 34.71 | Sixth lens | 34.71 |
| (7) | $\Delta\theta gFn < 0$ | 0.5834 | Sixth lens | −0.0019 |
| | | $\dfrac{Ndp}{}$ | | |
| (8) | $70 < vdp$ | 81.54 | Fourth lens | 81.54 |
| | | 81.54 | Seventh lens | 81.54 |
| | | $\Delta\theta gFp$ | | |
| (9) | $0 < \Delta\theta gFp$ | 0.5375 | Fourth lens | 0.0280 |
| | | 0.5375 | Seventh lens | 0.0280 |
| | | F | f2 | |
| (10) | $0.2 < f/f2 < 0.5$ | 6.00 | 17.99 | 0.33 |
| | | Ndn1 | | |
| (11) | $70 < vdn1$ | 70.24 | | 70.24 |

TABLE 16-continued

| | Relationship | | | Calculation result |
|---|---|---|---|---|
| | | $\Delta\theta gFn1$ | | |
| (12) | $0 < \Delta\theta gFn1$ | 0.5300 | | 0.0022 |
| | | F | f1 | |
| (13) | $|f1|/f > 8$ | 6.00 | 99.29 | 16.54 |

Example 8 f=5.95 F1.96

Data of Example 8 are shown in Table 17.

TABLE 17

| Surface number | R | D | N | ν | Glass species (material) | Memo | |
|---|---|---|---|---|---|---|---|
| 1 | 17.668 | 1.1 | 1.43875 | 94.94 | S-FPL53 | First lens | First F lens group |
| 2 | 6.924 | 2.77 | | | | | |
| 3 | 17.607 | 1.49 | 1.51633 | 64.06 | L-BSL7 | Second lens | |
| 4 | 4.987 | 10.53 | | | | | |
| 5 | 14.508 | 1.57 | 1.6485 | 53.02 | S-BSM71 | Third lens | First R lens group |
| 6 | −49.83 | 4.28 | | | | | |
| 7 | ∞ | 5.46 | — | — | | Aperture Stop | |
| 8 | ∞ | 2.06 | 1.497 | 81.54 | S-FPL51 | Fourth lens | Second F lens group |
| 9 | −6.201 | 1.1 | 1.72047 | 34.71 | S-NBH8 | Fifth lens | |
| 10 | −21.864 | 0.1 | | | | | |
| 11 | 8.59 | 0.8 | 1.834 | 37.16 | S-LAH60 | Sixth lens | |
| 12 | 6.936 | 3.08 | 1.497 | 81.54 | S-FPL51 | Seventh lens | |
| 13 | −16.638 | 1.75 | | | | | |
| 14 | 27.38 | 1.28 | 1.51633 | 64.06 | L-BSL7 | Eighth lens | Second R lens group |
| 15 | 18.061 | 6.05 | | | | | |
| 16 | ∞ | 1.5 | 1.54892 | 69.31 | | Filter | |
| 17 | ∞ | | | | | | |

Non-Aspheric Surface

The data for the non-aspheric surfaces are shown in Table 18.

TABLE 18

| | K | A2 | A4 | A6 | A8 | A10 |
|---|---|---|---|---|---|---|
| 4 | −0.4 | 0 | −3.0024E−04 | −1.2157E−05 | −4.2404E−09 | −7.3485E−09 |

| | A12 | A14 | A16 | A18 |
|---|---|---|---|---|
| | −3.6150E−11 | 2.1958E−14 | 8.9384E−15 | −1.9534E−15 |

| | K | A2 | A4 | A6 | A8 | A10 |
|---|---|---|---|---|---|---|
| 14 | 0 | 0 | −6.7647E−04 | −4.5873E−06 | −3.3230E−07 | 2.5347E−09 |

Calculation of Relationships for Example 8

The parameter values of each relationship are shown in Table 19.

TABLE 19

| | Relationship | | | Calculation result |
|---|---|---|---|---|
| | | vdn | | |
| (6) | $30 < vdn < 41$ | 34.71 | Fifth lens | 34.71 |
| | | 37.16 | Sixth lens | 37.16 |
| | | θgFn | | |
| (7) | $\Delta\theta gFn < 0$ | 0.5834 | Fifth lens | −0.0019 |
| | | 0.5776 | Sixth lens | −0.0037 |
| | | vdp | | |
| (8) | | 81.54 | Fourth lens | 81.54 |

TABLE 19-continued

| | Relationship | | | Calculation result | |
|---|---|---|---|---|---|
| | $70 < \nu dp$ | 81.54 | Seventh lens | 81.54 | |
| | $\Delta\theta gFp$ | | | | |
| (9) | $0 < \Delta\theta gFp$ | 0.5375 | Fourth lens | 0.0280 | |
| | | 0.5375 | Seventh lens | 0.0280 | |
| | $\dfrac{f}{f2}$ | | | | |
| (10) | $0.2 < f/f2 < 0.5$ | 5.95 | 13.22 | 0.45 | |
| | $\nu dn1$ | | | | |
| (11) | $70 < \nu dn1$ | 94.94 | | 94.94 | |
| | $\Delta\theta gFn1$ | | | | |
| (12) | $0 < \Delta\theta gFn1$ | 0.5340 | | 0.0461 | |
| | $\dfrac{f}{f1}$ | | | | |
| (13) | $|f1|/f > 8$ | 5.95 | 60.10 | 10.11 | |

Example 9 f=6.01 F1.96
Data of Example 9 are shown in Table 20.

TABLE 20

| Surface number | R | D | N | ν | Glass species (material) | Memo | |
|---|---|---|---|---|---|---|---|
| 1 | 18.588 | 1.08 | 1.43875 | 94.94 | S-FPL53 | First lens | First F lens group |
| 2 | 6.813 | 2.53 | | | | | |
| 3 | 17.313 | 1.31 | 1.51633 | 64.06 | L-BSL7 | Second lens | |
| 4 | 5.29 | 11.53 | | | | | |
| 5 | 13.578 | 1.5 | 1.65844 | 50.88 | S-BSM25 | Third lens | First R lens group |
| 6 | −113.066 | 2.64 | | | | | |
| 7 | ∞ | 6.29 | — | — | | Aperture Stop | |
| 8 | ∞ | 2.12 | 1.497 | 81.54 | S-FPL51 | Fourth lens | Second F lens group |
| 9 | −6.615 | 0.8 | 1.7495 | 35.33 | S-NBH51 | Fifth lens | |
| 10 | −22.385 | 0.1 | | | | | |
| 11 | 7.442 | 0.8 | 1.834 | 37.16 | S-LAH60 | Sixth lens | |
| 12 | 5.876 | 3.64 | 1.497 | 81.54 | S-FPL51 | Seventh lens | |
| 13 | −17.792 | 1.41 | | | | | |
| 14 | 105.224 | 2 | 1.51633 | 64.06 | L-BSL7 | Eighth lens | Second R lens group |
| 15 | 22.97 | 5.65 | | | | | |
| 16 | ∞ | 1.5 | 1.54892 | 69.31 | | Filter | |
| 17 | ∞ | | | | | | |

Non-Aspheric Surface
The data for the non-aspheric surfaces are shown in Table 21.

TABLE 21

| | K | A2 | A4 | A6 | A8 | A10 |
|---|---|---|---|---|---|---|
| 4 | −0.4 | 0 | −2.5773E−04 | −1.2262E−05 | −1.7334E−07 | −9.7531E−09 |
| | K | A2 | A4 | A6 | A8 | A10 |
| 14 | 0 | 0 | −8.0295E−04 | 5.0555E−06 | 3.9880E−08 | −5.1517E−09 |
| | K | A2 | A4 | A6 | A8 | A10 |
| 15 | 0 | 0 | −6.7868E−05 | 4.4517E−06 | 3.6008E−07 | 2.3799E−10 |

Calculation of Relationships for Example 9
Parameter Values of Relationship
The parameter values of each relationship are shown in Table 22.

TABLE 22

| | Relationship | | | Calculation result | |
|---|---|---|---|---|---|
| | $\nu dn$ | | | | |
| (6) | $30 < \nu dn < 41$ | 35.33 | Fifth lens | 35.33 | |
| | | 37.16 | Sixth lens | 37.16 | |
| | $\theta gFn$ | | | | |
| (7) | $\Delta\theta gFn < 0$ | 0.5818 | Fifth lens | −0.0025 | |
| | | 0.5776 | Sixth lens | −0.0037 | |
| | $\nu dp$ | | | | |
| (8) | $70 < \nu dp$ | 81.54 | Fourth lens | 81.54 | |
| | | 81.54 | Seventh lens | 81.54 | |
| | $\Delta\theta gFp$ | | | | |
| (9) | $0 < \Delta\theta gFp$ | 0.5375 | Fourth lens | 0.0280 | |
| | | 0.5375 | Seventh lens | 0.0280 | |
| | $\dfrac{f}{f2}$ | | | | |
| (10) | $0.2 < f/f2 < 0.5$ | 6.01 | 12.86 | 0.47 | |
| | $\nu dn1$ | | | | |
| (11) | $70 < \nu dn1$ | 94.94 | | 94.94 | |
| | $\Delta\theta gFn1$ | | | | |
| (12) | $0 < \Delta\theta gFn1$ | 0.5340 | | 0.0461 | |
| | $\dfrac{f}{f1}$ | | | | |
| (13) | $|f1|/f > 8$ | 6.01 | 60.03 | 9.99 | |

Example 10 f=5.95 F1.96
Data of Example 10 are shown in Table 23.

TABLE 23

| Surface number | R | D | N | ν | Glass species (material) | Memo | |
|---|---|---|---|---|---|---|---|
| 1 | 13.74 | 0.91 | 1.497 | 81.54 | S-FPL51 | First lens | First F lens group |
| 2 | 6.964 | 2.97 | | | | | |
| 3 | 16.335 | 1.45 | 1.51633 | 64.06 | L-BSL7 | Second lens | |
| 4 | 5.112 | 1.17 | | | | | |
| 5 | 15.223 | 2.71 | 1.70154 | 41.24 | S-BAH27 | Third lens | First R lens group |
| 6 | −124.25 | 1.99 | | | | | |
| 7 | ∞ | 5.75 | — | — | | Aperture Stop | |

TABLE 23-continued

| Surface number | R | D | N | ν | Glass species (material) | Memo | |
|---|---|---|---|---|---|---|---|
| 8 | ∞ | 2 | 1.497 | 81.54 | S-FPL51 | Fourth lens | Second F lens group |
| 9 | −7.051 | 1.47 | 1.7552 | 27.51 | S-TIH4 | Fifth lens | |
| 10 | −16.992 | 0.1 | | | | | |
| 11 | 8.425 | 0.8 | 1.8044 | 39.59 | S-LAH63 | Sixth lens | |
| 12 | 6.53 | 3.32 | 1.497 | 81.54 | S-FPL51 | Seventh lens | |
| 13 | −19.952 | 1.38 | | | | | |
| 14 | 22.8524 | 1.2 | 1.51633 | 64.06 | L-BSL7 | Eighth lens | Second R lens group |
| 15 | 12.545 | 6.29 | | | | | |
| 16 | ∞ | 1.5 | 1.54892 | 69.31 | | Filter | |
| 17 | ∞ | | | | | | |

Non-Aspheric Surface

The data for the non-aspheric surfaces are shown in Table 24.

TABLE 24

| | K | A2 | A4 | A6 | A8 | A10 |
|---|---|---|---|---|---|---|
| 4 | −0.47129 | 0 | −1.6548E−04 | −1.2875E−05 | 2.5638E−07 | −1.0822E−08 |

| | K | A2 | A4 | A6 | A8 | A10 |
|---|---|---|---|---|---|---|
| 14 | 0 | 0 | −6.3057E−04 | −3.6729E−06 | −2.3888E−07 | 4.3108E−09 |

Calculation of Relationships for Example 10

The parameter values of each relationship are shown in Table 25.

TABLE 25

| | Relationship | | | Calculation result |
|---|---|---|---|---|
| (6) | 30 < νdn < 41 | νdn 39.59 / θgFn | Sixth lens | 39.59 |
| (7) | ΔθgFn < 0 | 0.5729 Ndp | Sixth lens | −0.0045 |
| (8) | 70 < νdp | 81.54 81.54 ΔθgFp | Fourth lens Seventh lens | 81.54 81.54 |
| (9) | 0 < ΔθgFp | 0.5375 0.5375 f | Fourth lens Seventh lens f2 | 0.0280 0.0280 |
| (10) | 0.2 < f/f2 < 0.5 | 5.95 Ndn1 | 12.14 | 0.49 |
| (11) | 70 < νdn1 | 81.54 ΔθgFn1 | | 81.54 |
| (12) | 0 < ΔθgFn1 | 0.5375 f | f1 | 0.0280 |
| (13) | |f1|/f > 8 | 5.95 | 99.92 | 16.80 |

Example 11 f=5.95 F1.95

Data of Example 11 are shown in Table 26.

TABLE 26

| Surface number | R | D | N | ν | Glass species (material) | Memo | |
|---|---|---|---|---|---|---|---|
| 1 | 12.891 | 1.29 | 1.43875 | 94.94 | S-FPL53 | First lens | First F lens group |
| 2 | 6.507 | 3.41 | | | | | |
| 3 | 20.353 | 1.27 | 1.51633 | 64.06 | L-BSL7 | Second lens | |
| 4 | 4.87 | 1.34 | | | | | |
| 5 | 13.987 | 1.49 | 1.72 | 41.98 | S-LAM58 | Third lens | First R lens group |
| 6 | −166.79 | 3.68 | | | | | |
| 7 | ∞ | 4.06 | — | — | | Aperture Stop | |

TABLE 26-continued

| Surface number | R | D | N | ν | Glass species (material) | Memo | |
|---|---|---|---|---|---|---|---|
| 8 | ∞ | 1.89 | 1.497 | 81.54 | S-FPL51 | Fourth lens | Second F lens group |
| 9 | −7.537 | 0.8 | 1.76182 | 26.52 | S-TIH14 | Fifth lens | |
| 10 | −20.015 | 0.1 | | | | | |
| 11 | 10.242 | 0.94 | 1.854 | 40.39 | L-LAH85 | Sixth lens | |
| 12 | 7.791 | 1.8 | 1.497 | 81.54 | S-FPL51 | Seventh lens | |
| 13 | −72.796 | 3.61 | | | | | |
| 14 | 21.246 | 1.2 | 1.51633 | 64.06 | L-BSL7 | Eighth lens | Second R lens group |
| 15 | −3951.952 | 6.62 | | | | | |
| 16 | ∞ | 1.5 | 1.54892 | 69.31 | | Filter | |
| 17 | ∞ | | | | | | |

Non-Aspheric Surface

The data for the non-aspheric surfaces are shown in Table 27.

TABLE 27

| K | A2 | A4 | A6 | A8 | A10 |
|---|----|----|----|----|----|
| 4 | −0.4 | 0 | −3.8518E−04 | −1.2005E−05 | −1.8311E−07 | −2.8829E−09 |

| A12 | A14 | A16 | A18 |
|-----|-----|-----|-----|
| −1.7291E−10 | 2.1958E−14 | 8.9384E−15 | −1.9534E−15 |

| K | A2 | A4 | A6 | A8 | A10 |
|---|----|----|----|----|----|
| 14 | 0 | 0 | −4.2085E−04 | −5.7218E−07 | −2.6614E−08 | −1.2579E−09 |

Calculation of Relationships for Example 11

The parameter values of each relationship are shown in Table 28.

TABLE 28

| | Relationship | | | Calculation result |
|---|---|---|---|---|
| (6) | $30 < \nu dn < 41$ | $\nu dn$ 40.39 | Sixth lens | 40.39 |
| (7) | $\Delta\theta gFn < 0$ | $\theta gFn$ 0.5677 | Sixth lens | −0.0084 |
| (8) | $70 < \nu dp$ | $\nu dp$ 81.54 81.54 | Fourth lens Seventh lens | 81.54 81.54 |
| (9) | $0 < \Delta\theta gFp$ | $\Delta\theta gFp$ 0.5375 0.5375 | Fourth lens Seventh lens | 0.0280 0.0280 |
| (10) | $0.2 < f/f2 < 0.5$ | f 5.95 | f2 20.00 | 0.30 |
| (11) | $70 < \nu dn1$ | $\nu dn1$ 94.94 | | 94.94 |
| (12) | $0 < \Delta\theta gFn1$ | $\Delta\theta gFn1$ 0.5340 | | 0.0461 |
| (13) | $|f1|/f > 8$ | f 5.95 | f1 59.92 | 10.07 |

In the representation of the aspheric surface, for example, −2.6614E−08 means $2.6614 \times 10^{-8}$ FIGS. 17 to 22 illustrate aberration graphs relating to Examples 6 to 11 for an indefinite object of the image forming lens.

In these aberration diagrams, the broken line of the spherical aberration represents the sine condition, and the solid line and the broken line in the astigmatism represent a sagittal image plane and a meridional image plane, respectively.

"d" and "g" represent aberration for d line, and g line, respectively.

In each Example, the aberration is sufficiently corrected and the image forming lenses have an extremely excellent image performance while the lens is small-sized and has a half angle of 38 degree or more and a large diameter of about F2.0 or less.

Another four embodiments (examples) of the photographic optical system (image forming lens) are described with reference to FIGS. 23 to 26.

These examples specifically relates to Examples 12 to 15 described later. The same reference numerals are used in common in FIGS. 23 to 26.

The image forming lens illustrated in FIGS. 23 to 26 are structured to have a first lens group G1 arranged on the object side (left-hand side in FIGS. 23 to 26) relative to an aperture stop S and a second lens group G2 arranged on the image side (right-hand side in FIGS. 23 to 26) relative to the aperture stop S.

The first lens group G1 includes a first G1F lens group having a negative power, and a first R lens G1R element having a positive power arranged from the object side. The first F lens group G1F and the first R element G1R are positioned with the widest air gap from each other in the first lens group G1.

The first F lens group G1F has two negative e lenses (meniscus lens with its concavity surface toward the image side) and the first R lens group G1R has one positive lens.

The second lens group G2 includes a second F lens group G2F and a second R lens group G2R in this sequence from the aperture stop side.

The second lens group G2F has a positive power with an arrangement of a first positive lens, a first negative lens, a second negative lens, and a second positive lens in this sequence from the object side. The first positive lens and the first negative lens have a positive or negative focus synthesis length and the second negative lens and the second positive lens are cemented as a positive cemented lens.

The second R lens group G2R has one lens. The one lens constituting the Second R lens group G2R of any of Example 12 to 15 is a positive lens.

The image forming lens (photographic optical system) of Examples 12 to 15 has a focal length f of the entire system, a focal length f1 of the first lens group, and a focal length f2 of the second F lens, and a focal length f3 of the second R lens and satisfies the relationships (14) to (16).

In each Example, the focus synthesis length f21 of the first positive lens and the first negative lens in the second F lens group and the focus synthesis length f22 of the positive cemented lens formed of the second negative lens and the second positive lens.

In each Example, the thickness T2f of the second F lens group, the thickness T1 of the first lens group, and a thickness T2r of the second R lens group on the optical axis satisfies the relationship (18).

In each Example, the first negative lens of the second F lens group G2F is a meniscus lens with its convex surface toward the image side) and the first positive lens and the first negative lens in the second F lens group G2F are cemented as a cemented lens.

Focusing from indefinite to a close range is conducted by moving part of or entire of the second lens group.

In any Example of FIGS. 23 to 26, the lens is retracted when not in use, and the second lens group G2F in the second lens group G2 is a retractable element and retracted from the optical axis when not in use.

An embodiment of the handheld terminal is described with reference to FIGS. 31 and 32.

Figure 31A:
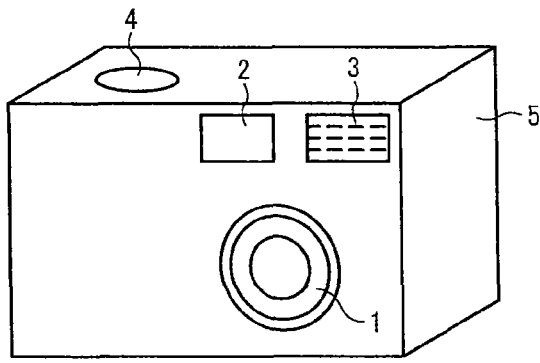
FIG. 31A is an external view illustrating an embodiment of the handheld terminal.
Figure 31B:
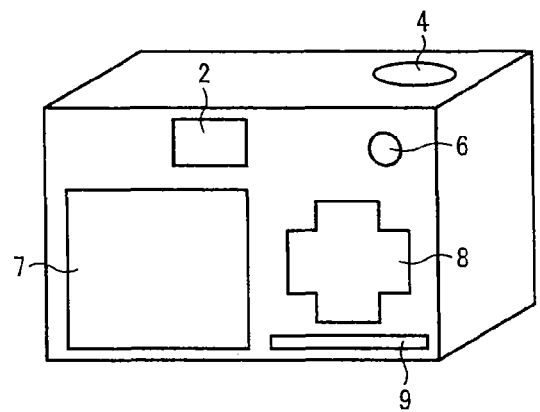
FIG. 31B is an external view illustrating an embodiment of the handheld terminal.

FIG. 31A illustrates the front and the upper portion of the handheld terminal and FIG. 31B illustrates a rear and upper portion thereof. The handheld terminal uses any one of the image forming lenses described above (specifically Examples described later).

Figure 32:
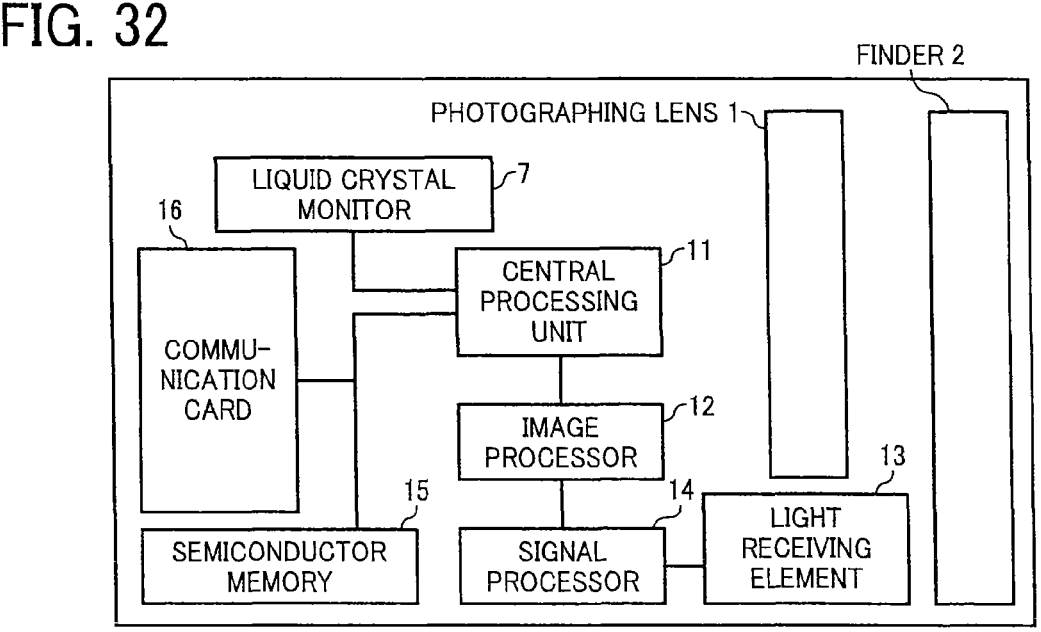
FIG. 32 is a block chart illustrating an example of the system structure of the handheld terminal of FIG. 31.

FIG. 32 is a block chart illustrating an example of the system structure of the handheld terminal.

As illustrated in FIG. 32, a handheld terminal includes a shooting lens 1 and a light reception element (electron photo shooting element in which pixels are arranged in two dimensions) 13. An image of the shooting object which is formed by the shooting lens 1 is read by the light reception element 13.

The output of the light reception element 13 is converted into digital information by a signal control device 14 that is controlled by a central processing unit 11.

That is, the handheld terminal has a function of converting a shot image into digital information.

The digitized shot image is image-processed by an image processing unit 12 that is controlled by the central processing unit 11. The image-processed image can be displayed on a liquid crystal monitor 7 and saved in a semiconductor memory 15.

In addition, the image can be transmitted outside through a communication card, etc. 16. The communication card etc. 16 can be accommodated in a slot 9 illustrated in 31A.

The entire device excluding the communication function by the communication card, etc. 16 constitutes the camera device functioning as the photo shooting function part in the handheld terminal.

The focusing system described above can be set to be selective from a menu display, etc.

An example of the retraction of the second F lens group from the optical axis is described with reference to FIGS. 33 and 34.

Figure 33:
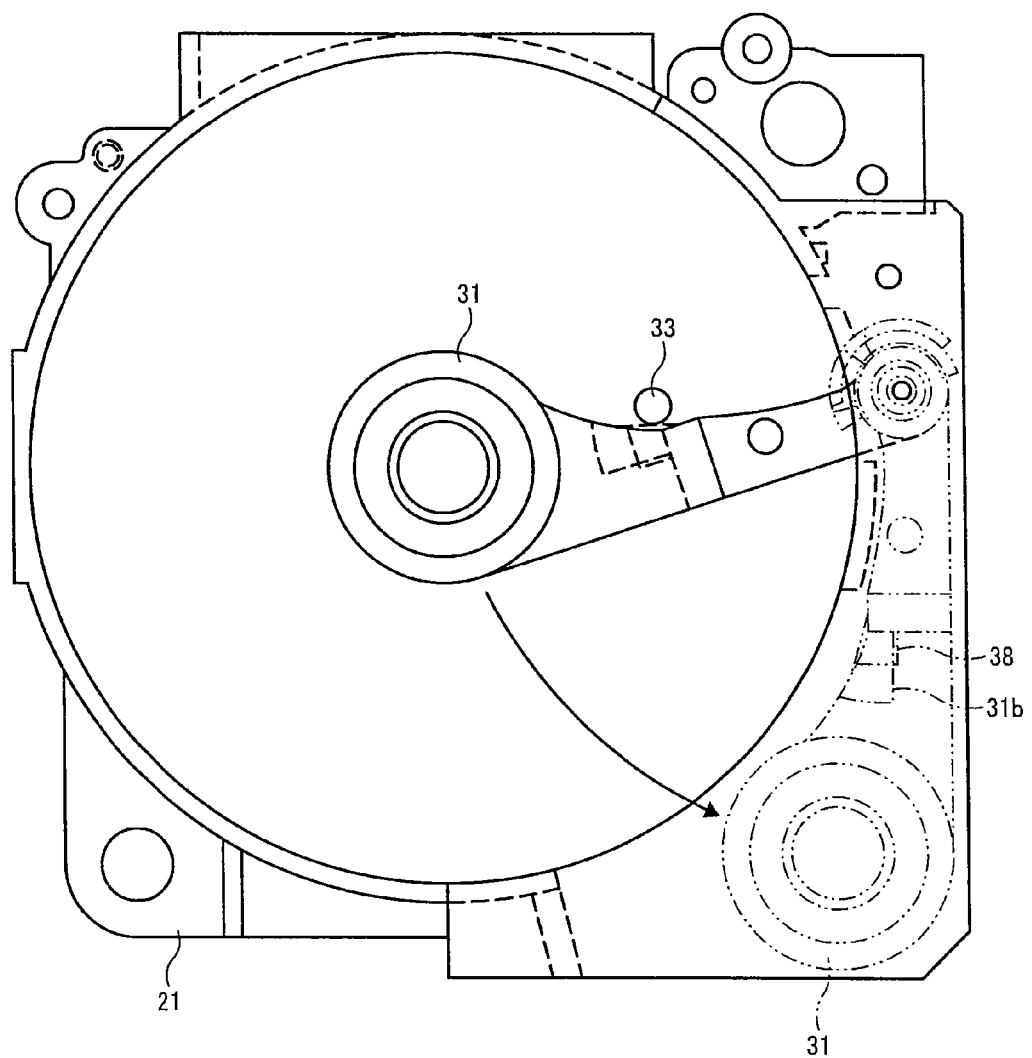
FIG. 33 is a diagram illustrating an example of the mechanism of retracting the second F lens group from the optical axis when not in use.

FIG. 33 is a view of the lens barrel of a camera device from the front side of the camera device. FIG. 34 is a perspective of the retraction mechanism of retracting the second F lens group illustrated in FIG. 33

Figure 34:
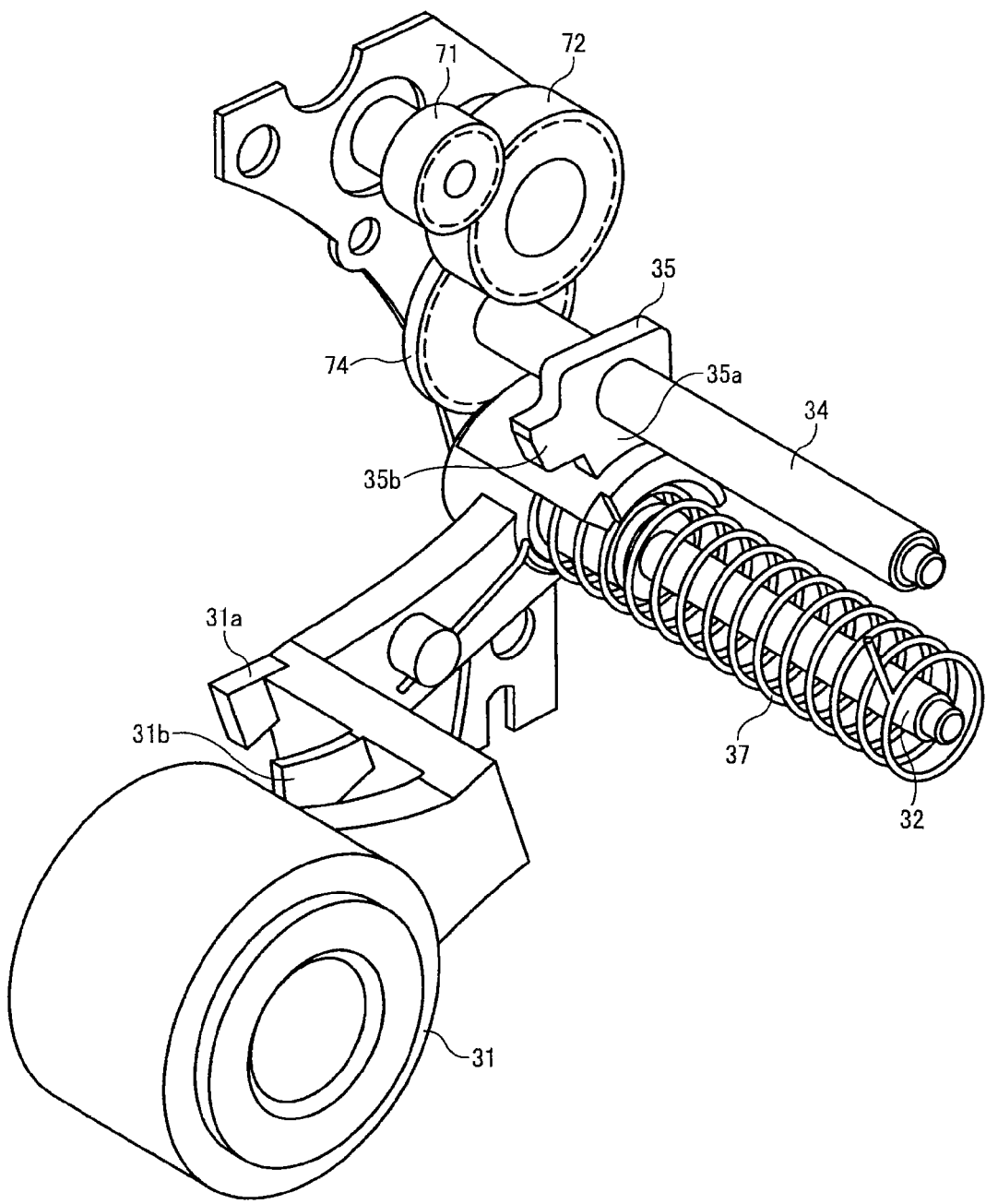
FIG. 34 is a diagram illustrating an example of the mechanism of retracting the second F lens group from the optical axis when not in use.

In FIG. 34, the second f lens group is held by a holding frame 31.

The driving force from a driving source (not shown) is conveyed through a series of gears of a gear 71, gear 72 and gear 74 to rotate a lead screw 34.

The rotation of the lead screw 34 displaces an internal member 35 screwed to the lead screw 34 along the lead screw 34.

The lead screw 34 is substantially parallel to the optical axis of the image forming lens.

The internal member 35 is integrally fixed to the holding frame 31 and displaces the holding frame 31 and the second F lens group held thereby to the optical axis by the displacement.

The displacement of the internal screw member 31 is biased by a compressed torsion spring 37.

The second F lens group is retracted on the image formation element side when retracted and rotated counterclockwise around the lead screw 24 in FIG. 33 by a bias of a cum mechanism (not shown) and the compressed torsion spring 37 (moved to the direction indicated by an arrow).

In FIG. 33, the holding frame 31 is retracted from the optical axis and thus doe not prevent displacement of a holding frame (not shown) holding the first lens group to be retracted and a straight moving barrel to the optical axis.

When the lens barrel protrudes to shoot an image by protruding the holding frame (not shown) and the straight moving barrel (not shown) to a predetermined position, the holding frame 31 rotates in the direction (clockwise) reverse to the direction indicated by an arrow in FIG. 33 by a bias of the cum mechanism (not shown) and the compressed torsion spring to a position determination axis 33 to secure the position on the optical axis.

Figure 35A:
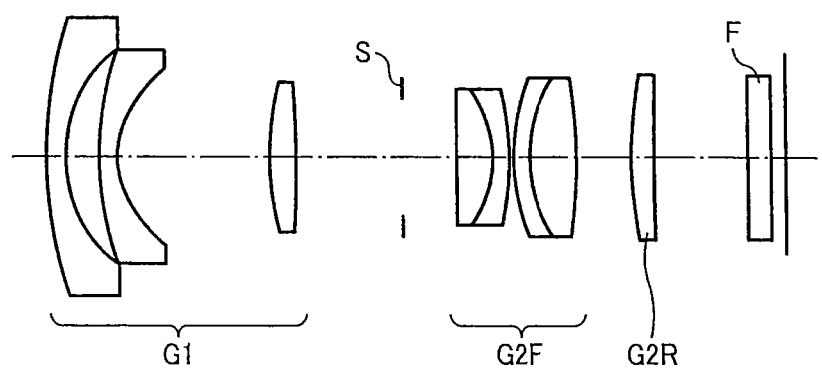
FIG. 35A is a diagram illustrating an embodiment of the relative positional relationship of each lens group when a photo is taken.

The diagram of FIG. 35A represents the position of the photographic optical system in the image formation mode.

Figure 35B:
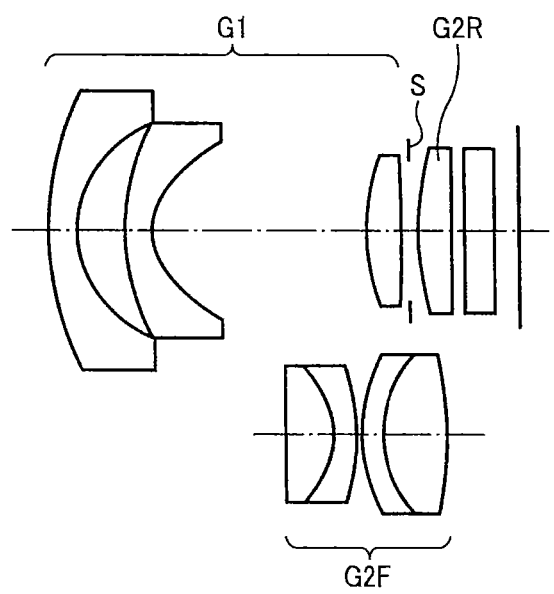
FIG. 35B is a diagram illustrating an embodiment of the relative positional relationship of each lens group when not in use (retracted).

The diagram of FIG. 35B represents the position of the photographic optical system in the retraction state.

As illustrated in FIG. 35, the second R lens group G2R approaches to the image surface by retraction, the first lens group C1 reduces the gap to the second R lens group G2R by retraction and the second F lens G2F approaches the image surface by retraction and is retracted from the optical axis.

Specific examples of the image forming lenses are described below.

The reference numeral in Examples represent the following:

f: Focal distance of the entire system
F: F number
ω: Half image angle
Y': Maximum image height
R: Curvature radius
D: Space between surfaces
Nd: Refraction index
νd: Abbe number
K: Conic constant of aspheric surface
$A_4$: Fourth order aspheric coefficient
$A_6$: Sixth order aspheric coefficient
$A_8$: Eighth order aspheric coefficient
$A_{10}$: Tenth order aspheric coefficient The aspheric surface is represented by the following relationship with respective aspheric coefficients.

$$X=CH^2/[1+\sqrt{(1-(1+K)C^2H^2)}]+A_4 \cdot H^4+A_6 \cdot H^6+A_8 \cdot H^8+A_{10} \cdot H^{10}+A_{12} \cdot H^{12}+A_{14} \cdot H^{14}+A_{16} \cdot H^{16}+A_{18} \cdot H^{18}$$

where C denotes an inverse of a paraxial curvature radius (paraxial curvature), H denotes a height from an optical axis of the image forming lens system, and k represents a conic multiplier number The glass materials (species) are the names of the products available from Ohara Inc.

Example 12

Data of Example 12 are shown in Table 29.
Focal length: 6.00
Half image angle: 39.09°
F number: 1.96

TABLE 29

| Surface number | R | D | N | ν | Glass species (material) | Memo | |
|---|---|---|---|---|---|---|---|
| 1 | 25.026 | 1.2 | 1.497 | 81.54 | S-FPL51 | First lens | First F lens group |
| 2 | 8 | 2.27 | | | | | |
| 3 | 17.5 | 1.2 | 1.51633 | 64.06 | L-BSL7 | Second lens | |
| 4 | 5.073 | 9.62 | | | | | |
| 5 | 18.209 | 1.71 | 1.83481 | 42.71 | S-LAH55 | Third lens | First R lens group |
| 6 | −88.519 | 6.7 | | | | | |
| 7 | ∞ | 3.5 | — | — | | Aperture Stop | |

TABLE 29-continued

| Surface number | R | D | N | ν | Glass species (material) | Memo | |
|---|---|---|---|---|---|---|---|
| 8 | ∞ | 2.27 | 1.497 | 81.54 | S-FPL51 | Fourth lens | Second F lens group |
| 9 | −7.559 | 1 | 1.72151 | 29.23 | S-TIH18 | Fifth lens | |
| 10 | −20.637 | 0.2 | | | | | |
| 11 | 12.826 | 1 | 1.65412 | 39.68 | S-NBH5 | Sixth lens | |
| 12 | 8.341 | 3.03 | 1.497 | 81.54 | S-FPL51 | Seventh lens | |
| 13 | −26.301 | 3.65 | | | | | |
| 14 | 18.125 | 1.5 | 1.51633 | 64.06 | L-BSL7 | Eighth lens | Second R lens group |
| 15 | 160.356 | 6.07 | | | | | |
| 16 | ∞ | 1.5 | 1.54892 | 69.31 | | Filter | |
| 17 | ∞ | | | | | | |

Non-Aspheric Surface

The data for the non-aspheric surface are shown in Table 30.

TABLE 30

| | K | A2 | A4 | A6 | A8 | A10 |
|---|---|---|---|---|---|---|
| 4 | −0.4 | 0 | −3.8568E−04 | −8.2523E−06 | −1.1521E−07 | −2.5946E−09 |

| | A12 | A14 | A16 | A18 |
|---|---|---|---|---|
| | −2.7651E−11 | −1.2444E−13 | 2.3642E−15 | −1.1047E−15 |

| | K | A2 | A4 | A6 | A8 | A10 |
|---|---|---|---|---|---|---|
| 14 | 0 | 0 | −2.9359E−04 | −2.2462E−06 | −1.6205E−07 | 2.3075E−09 |

Parameter Values of Relationship

The parameter values of each relationship are shown in Table 31

TABLE 31

| Relationship | | | Calculation result |
|---|---|---|---|
| | f | f2 | |
| (14) 0.2 < f/f2 < 0.5 | 6.00 | 17.78 | 0.338 |
| | f22 | f21 | |
| (15) \|f22/f21\| < 0.5 | 20.08 | 170.52 | 0.12 |
| | f1 | f | |
| (16) \|f1\|/f > 8.0 | 251.01 | 6.00 | 41.81 |
| | f3 | | |
| (17) 0.3 > \|f/f3\| > 0.1 | 39.44 | 6.00 | 0.15 |
| | T1 + T2r | T2f | |
| (18) 1 ≥ T2f/(T1 + T2r) > 0.1 | 17.5 | 7.5 | 0.43 |

Example 13

Data of Example 13 are shown in Table 32.

TABLE 32

Focal length: 6.00
Half image angle: 39.12°
F number: 1.95

| Surface number | R | D | N | ν | Glass species (material) | Memo | |
|---|---|---|---|---|---|---|---|
| 1 | 25.96 | 1.2 | 1.48749 | 70.24 | S-FSL5 | First lens | First F lens group |
| 2 | 7.2 | 2.51 | | | | | |
| 3 | 15 | 1.2 | 1.51633 | 64.06 | L-BSL7 | Second lens | |
| 4 | 4.926 | 8.83 | | | | | |
| 5 | 18.357 | 1.76 | 1.804 | 46.57 | S-LAH65 | Third lens | First R lens group |
| 6 | −46.654 | 6.22 | | | | | |
| 7 | ∞ | 4.26 | — | — | | Aperture Stop | |
| 8 | 115.069 | 1.99 | 1.497 | 81.54 | S-FPL51 | Fourth lens | Second F lens group |
| 9 | −8.3 | 1 | 1.74077 | 27.79 | S-TIH13 | Fifth lens | |

TABLE 32-continued

Focal length: 6.00
Half image angle: 39.12°
F number: 1.95

| Surface number | R | D | N | ν | Glass species (material) | Memo | |
|---|---|---|---|---|---|---|---|
| 10 | −21.635 | 0.2 | | | | lens | |
| 11 | 12.473 | 1 | 1.72047 | 34.71 | S-NBH8 | Sixth lens | |
| 12 | 8.433 | 2.51 | 1.497 | 81.54 | S-FPL51 | Seventh lens | |
| 13 | −33.186 | 3.4 | | | | | |
| 14 | 16.892 | 1.5 | 1.51633 | 64.06 | L-BSL7 | Eighth lens | Second R lens group |
| 15 | 108.71 | 5.73 | | | | | |
| 16 | ∞ | 1.5 | 1.54892 | 69.31 | | Filter | |
| 17 | ∞ | | | | | | |

Aspheric Surface

The data for the aspheric surfaces are shown in Table 33.

TABLE 33

|   | K | A2 | A4 | A6 | A8 | A10 |
|---|---|---|---|---|---|---|
| 4 | −0.89455 | 0 | 6.6197E−05 | −2.2678E−06 | −9.2764E−08 | −1.0794E−09 |
|   | K | A2 | A4 | A6 | A8 | A10 |
| 14 | 0 | 0 | −3.1109E−04 | 2.2882E−06 | −1.4584E−07 | 1.8406E−09 |

Parameter Values of Relationship

The parameter values of each relationship are shown in Table 34.

TABLE 34

| Relationship | | | Calculation result |
|---|---|---|---|
|  | F | f2 |  |
| (14) $0.2 < f/f2 < 0.5$ | 6.00 | 17.99 | 0.334 |
|  | f22 | f21 |  |
| (15) $|f22/f21| < 0.5$ | 20.24 | 103.63 | 0.20 |
|  | f1 | f |  |
| (16) $|f1|/f > 8.0$ | 99.29 | 6.00 | 16.54 |
|  | f3 |  |  |
| (17) $0.3 > |f/f3| > 0.1$ | 38.52 | 6.00 | 0.15 |
|  | T1 + T2r | T2f |  |
| (18) $1 \geq T2f/(T1 + T2r) > 0.1$ | 17 | 6.7 | 0.39 |

Example 14

Data of Example 14 are shown in Table 35.

TABLE 35

Focal length: 5.95
Half image angle: 38.89°
F number: 1.95

| Surface number | R | D | N | ν | Glass species (material) | Memo | |
|---|---|---|---|---|---|---|---|
| 1 | 25.546 | 1.51 | 1.43875 | 94.94 | S-FPL53 | First lens | First F lens group |
| 2 | 7.305 | 2.83 |  |  |  |  |  |
| 3 | 16.133 | 1.13 | 1.51633 | 64.06 | L-BSL7 | Second lens |  |
| 4 | 5.011 | 9.91 |  |  |  |  |  |
| 5 | 15.571 | 1.87 | 1.816 | 46.62 | S-LAH59 | Third lens | First R lens group |
| 6 | ∞ | 7.45 |  |  |  |  |  |
| 7 | ∞ | 3.7 | — | — |  | Aperture Stop |  |
| 8 | ∞ | 1.89 | 1.497 | 81.54 | S-FPL51 | Fourth lens | Second F lens group |
| 9 | −7.542 | 1.33 | 1.72047 | 34.71 | S-NBH8 | Fifth lens |  |
| 10 | −26.005 | 0.1 |  |  |  |  |  |
| 11 | 9.634 | 1.05 | 1.834 | 37.16 | S-LAH60 | Sixth lens |  |
| 12 | 6.84 | 2.09 | 1.497 | 81.54 | S-FPL51 | Seventh lens |  |
| 13 | 139.168 | 2.02 |  |  |  |  |  |
| 14 | 39.054 | 1.79 | 1.497 | 81.54 | K-FPK80 | Eighth lens | Second R lens group |
| 15 | −14.913 | 2.13 |  |  |  |  |  |
| 16 | ∞ | 1.5 | 1.54892 | 69.31 |  | Filter |  |
| 17 | ∞ |  |  |  |  |  |  |

Aspheric Surface

The data for the aspheric surfaces are shown in Table 36.

TABLE 36

|   | K | A2 | A4 | A6 | A8 | A10 |
|---|---|---|---|---|---|---|
| 4 | −0.4 | 0 | −4.4138E−04 | −8.9004E−06 | −1.8901E−07 | −2.0482E−09 |
|  | A12 | A14 | A16 | A18 |  |  |
|  | −3.615E−11 | −2.1958E−14 | 8.93836E−15 | −1.9534E−15 |  |  |
|  | K | A2 | A4 | A6 | A8 | A10 |
| 14 | 0 | 0 | −3.4075E−04 | 1.0500E−06 | 9.7822E−09 | −1.1862E−09 |

Parameter Values of Relationship

The parameter values of each relationship are shown in Table 37.

TABLE 37

| Relationship | | | Calculation result |
|---|---|---|---|
| | f | f2 | |
| (14) 0.2 < f/f2 < 0.5 | 5.95 | 27.74 | 0.214 |
| | f22 | f21 | |
| (15) \|f22/f21\| < 0.5 | 27.37 | −776.44 | 0.04 |
| | f1 | f | |
| (16) \|f1\|/f > 8.0 | 6650.74 | 5.95 | 1117.94 |
| | f3 | | |
| (17) 0.3 > \|f/f3\| > 0.1 | 21.96 | 5.95 | 0.27 |
| | T1 + T2r | T2f | |
| (18) 1 ≥ T2f/(T1 +T2r) > 0.1 | 19.04 | 6.46 | 0.34 |

Example 15

Data of Example 15 are shown in Table 38.

TABLE 38

Focal length: 5.95
Half image angle: 38.89°
F number: 1.96

| Surface number | R | D | N | ν | Glass species (material) | Memo | |
|---|---|---|---|---|---|---|---|
| 1 | 20.483 | 1.99 | 1.497 | 81.54 | S-FPL51 | First lens | First F lens |
| 2 | 6.879 | 2.99 | 1.497 | 81.54 | | | |
| 3 | 16.862 | 1.35 | 1.51633 | 64.06 | L-BSL7 | Second lens | group |
| 4 | 5.056 | 8.58 | | | | | |
| 5 | 21.32 | 2.15 | 1.816 | 46.62 | S-LAH59 | Third lens | First R lens group |
| 6 | −41.891 | 7.21 | | | | | |

TABLE 38-continued

Focal length: 5.95
Half image angle: 38.89°
F number: 1.96

| Surface number | R | D | N | ν | Glass species (material) | Memo | |
|---|---|---|---|---|---|---|---|
| 7 | ∞ | 2.15 | — | — | Aperture Stop | | |
| 8 | ∞ | 2.47 | 1.497 | 81.54 | S-FPL51 | Fourth lens | Second F lens group |
| 9 | −7.343 | 1.79 | 1.72047 | 34.71 | S-NBH8 | Fifth lens | |
| 10 | −16.26 | 0.1 | | | | | |
| 11 | 13.676 | 1.35 | 1.7847 | 26.29 | S-TIH23 | Sixth lens | |
| 12 | 8.58 | 1.88 | 1.497 | 81.54 | S-FPL51 | Seventh lens | |
| 13 | −55.418 | 1.2 | | | | | |
| 14 | −48.351 | 1.45 | 1.497 | 81.5 | K-FPK80 | Eighth lens | Second R lens group |
| 15 | −12.062 | 2.13 | | | | | |
| 16 | ∞ | 1.5 | 1.54892 | 69.31 | | Filter | |
| 17 | ∞ | | | | | | |

Aspheric Surface

The data for the aspheric surfaces are shown below.

TABLE 39

| | K | A2 | A4 | A6 | A8 | A10 |
|---|---|---|---|---|---|---|
| 4 | −0.4 | 0 | −4.2401E−04 | −1.1004E−05 | −1.5578E−07 | −3.5255E−09 |

| A12 | A14 | A16 | A18 |
|---|---|---|---|
| −5.43E−11 | 7.70E−13 | 8.9384E−15 | −1.9534E−15 |

| | K | A2 | A4 | A6 | A8 | A10 |
|---|---|---|---|---|---|---|
| 14 | 0 | 0 | −3.0100E−04 | 2.5653E−06 | −1.1105E−07 | 1.4581E−09 |

Parameter Values of Relationship

The parameter values of each relationship are shown in Table 40.

TABLE 40

| Relationship | | | Calculation result |
|---|---|---|---|
| | f | f2 | |
| (14) 0.2 < f/f2 < 0.5 | 5.95 | 20.00 | 0.298 |
| | f22 | f21 | |
| (15) \|f22/f21\| < 0.5 | 29.77 | 65.43 | 0.45 |
| | f1 | F | |
| (16) \|f1\|/f > 8.0 | 517.48 | 5.95 | 86.96 |
| | f3 | | |
| (17) 0.3 > \|f/f3\| > 0.1 | 31.91 | 5.95 | 0.19 |

TABLE 40-continued

| Relationship | | | Calculation result |
|---|---|---|---|
| | T1 + T2r | T2f | |
| (18) 1 ≥ T2f/(T1 + T2r) > 0.1 | 18.51 | 7.59 | 0.41 |

FIGS. 25 to 28 illustrate aberration graphs relating to Examples 12 to 15.

In these aberration diagrams, the broken line of the spherical aberration represents the sine condition, and the solid line and the broken line in the astigmatism represent a sagittal image plane and a meridional image plane, respectively. "d" and "g" represent d lines and g lines, respectively.

As apparent from the aberration diagrams, these image forming lenses have a half angle of 38 degree or more and a large diameter of F2.0 or less with high performance suitable for a photo shooting element of from 10 million to 20 million pixels.

In addition, the compact property is secured by accommodating the second F lens group from the optical axis by retraction.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A fixed focal length image forming lens comprising:
   an aperture stop;
   a first lens group arranged on an object side relative to the aperture stop; and
   a second lens group having a positive power arranged on an image side relative to the aperture stop,
   the first lens group comprising a first F lens group having a negative power and a first R lens group having a positive power arranged in this sequence from the object side with a widest air space within the first lens group between the first F lens group and the first R lens group, the first F lens group comprising at least two negative lenses, the first R lens group comprising at least one positive lens,
   the second lens group comprising a second F lens group having a positive power and a second R lens group arranged in this sequence from the object side, the second F lens group comprising a first positive lens, a first negative lens, a second negative lens, and a second positive lens continuously arranged in this sequence from the object side,
   wherein the second R lens group comprises one positive lens or one negative lens, and at least one negative lens in the second F lens group satisfies the following relationships (6) and (7):

$$30 < vdn < 41 \quad (6)$$

$$\Delta\theta gFn < 0 \quad (7)$$

where vdn represents an Abbe number of a material forming at least one of the negative lenses in the second F lens group and ΔθgFn represents an abnormal dispersion property of the material, where the abnormal dispersion property ΔθgF is defined as a deviation from a reference line defined as a straight line connecting a coordinate point of a reference glass species K7, where vd=60.49 and θgF=0.5436, and a coordinate point of a reference glass species F2, where vd=36.26 and θgF=0.5828, on a two-dimensional coordinate having two orthogonal axes of a Y axis representing a partial dispersion ratio θgF and an X axis representing an Abbe number vd, and the partial dispersion ratio θgF is defined by the following relationship:

$$\theta gF = (ng - nF)/(nF - nC),$$

where ng represents a refraction index of Fraunhofer line to g line, nF represents a refraction index of Fraunhofer line to F line, and nC represents a refraction index of Fraunhofer line to C line.

2. The image forming lens according to claim 1, wherein an Abbe number vdp and an abnormal dispersion property ΔθgFp of a material of at least one of the positive lenses in the second F lens group satisfy the following relationships (8) and (9):

$$70 < vdp \quad (8)$$

$$0 < \Delta\theta gFp \quad (9).$$

3. The image forming lens according to claim 1, wherein a focal length f of an entire system and a focal length f2 of the second F lens group satisfy the following relationship (10):

$$0.2 < f/f2 < 0.5 \quad (10).$$

4. The image forming lens according to claim 1, wherein a focal length f of an entire system and a focal length f1 of the first lens group satisfy the following relationship (11):

$$|f1|/f > 8 \quad (11).$$

5. The image forming lens according to claim 1, wherein an Abbe number vdn1 and an abnormal dispersion property ΔθgFn1 of a material of at least one of the negative lenses in the first F lens group satisfy the following relationships (12) and (13):

$$70 < vdn1 \quad (12)$$

$$0 < \Delta\theta gFn1 \quad (13).$$

6. The image forming lens according to claim 1, wherein the second negative lens in the second F lens group comprises a material satisfying the relationships (6) and (7).

7. A camera device comprising:
   a camera body; and
   the image forming lens of claim 1.

8. The camera device according to claim 7, wherein the image forming lens is retractable into the camera body and the second F lens group is retractable from an optical axis of the image forming lens when the image forming lens is retracted into the camera body.

9. A handheld terminal comprising:
   the camera device of claim 7.

* * * * *